US007808673B2

(12) United States Patent
Fabel et al.

(10) Patent No.: US 7,808,673 B2
(45) Date of Patent: Oct. 5, 2010

(54) METHOD AND SYSTEM FOR SENDING NOTIFICATION OF AN ISSUED DRAFT

(75) Inventors: Warren M. Fabel, Boca Raton, FL (US); Charles A. Campbell, Deerfield Beach, FL (US); Gene I. Kofman, Parkland, FL (US)

(73) Assignee: Laser Substrates, Inc., Boca Raton, FL (US)

( * ) Notice: Subject to any disclaimer, the term of this patent is extended or adjusted under 35 U.S.C. 154(b) by 1138 days.

(21) Appl. No.: 11/371,434

(22) Filed: Mar. 9, 2006

(65) Prior Publication Data

US 2006/0227351 A1 Oct. 12, 2006

Related U.S. Application Data

(63) Continuation-in-part of application No. 10/272,161, filed on Oct. 15, 2002, now Pat. No. 7,379,203, which is a continuation-in-part of application No. 10/172,154, filed on Jun. 14, 2002, now Pat. No. 7,196,808, which is a continuation-in-part of application No. 10/133,100, filed on Apr. 26, 2002, now Pat. No. 7,085,998.

(60) Provisional application No. 60/367,118, filed on Mar. 22, 2002.

(51) Int. Cl.
  *G06F 15/00* (2006.01)
  *B41B 1/00* (2006.01)
(52) U.S. Cl. .................. 358/1.18; 358/1.13; 358/1.15
(58) Field of Classification Search ............. 358/1.13, 358/1.18, 1.15; 707/102
See application file for complete search history.

(56) References Cited

U.S. PATENT DOCUMENTS

| 4,974,878 | A | * | 12/1990 | Josephson | .................. 283/67 |
| 5,557,780 | A | | 9/1996 | Edwards et al. | |
| 6,029,182 | A | | 2/2000 | Nehab et al. | |

(Continued)

OTHER PUBLICATIONS

MSN Money, "Standard Register and HarrisData Announce Strategic Marketing Alliance to Provide Secure Document Delivery," Dayton, Onio—(Business Wire)—May 3, 2003, http://news.moneycentral.msn.com/ticker/article.asp?Feed=BW&Date=20020503&ID=1611076&Symbol=US:SR.

(Continued)

*Primary Examiner*—Thomas D Lee
(74) *Attorney, Agent, or Firm*—Jon A. Gibbons; Fleit Gibbons Gutman Bongini & Bianco P.L.

(57) ABSTRACT

A system, method and computer readable medium for capturing check data during a print process is disclosed. The method on a computer system includes observing a print command issued by an application to send check information to a printer. Next, a spool file in a condensed format, such as Extended Metafile Format (EMF), is written to a disk in response to the print command. This spool file read, and subsequently an output file is generated based on information in the spool file. The output file is written in EMF format if the output file contains image information. If the output file does not contain image information, the output file is written in text format. Then, the output file is modified to conform to a template. Lastly, the output file that was modified is sent to an output destination, such as a file storage space, a bank or a printer.

18 Claims, 33 Drawing Sheets

U.S. PATENT DOCUMENTS

| | | | |
|---|---|---|---|
| 6,031,625 | A | 2/2000 | Sherman et al. |
| 6,181,893 | B1 | 1/2001 | Collard et al. |
| 6,230,143 | B1 | 5/2001 | Simons et al. |
| 6,240,456 | B1 | 5/2001 | Teng et al. |
| 6,260,044 | B1 | 7/2001 | Nagral et al. |
| 6,282,524 | B1 | 8/2001 | Kramer |
| 6,337,743 | B1 | 1/2002 | Brown et al. |
| 6,339,832 | B1 | 1/2002 | Bowman-Amuah |
| 6,449,652 | B1 | 9/2002 | Blumenau et al. |
| 6,549,909 | B1 | 4/2003 | Yamauchi et al. |
| 6,621,591 | B2 | 9/2003 | Kramer et al. |
| 6,910,628 | B1 | 6/2005 | Sehr |
| 6,965,569 | B1 | 11/2005 | Carolan et al. |
| 7,085,998 | B2 | 8/2006 | Kofman et al. |
| 2001/0056387 | A1 | 12/2001 | Magary et al. |
| 2002/0059265 | A1 | 5/2002 | Valorose, III |
| 2002/0065786 | A1* | 5/2002 | Martens et al. ............... 705/70 |
| 2002/0078663 | A1 | 6/2002 | Kramer et al. |
| 2002/0082935 | A1 | 6/2002 | Moore et al. |
| 2003/0023522 | A1 | 1/2003 | Dutta et al. |
| 2003/0038964 | A1 | 2/2003 | Ferlitsch |
| 2003/0090697 | A1 | 5/2003 | Lester et al. |
| 2003/0179403 | A1 | 9/2003 | Kofman et al. |
| 2004/0054630 | A1 | 3/2004 | Ginter et al. |

OTHER PUBLICATIONS

Wachovia, "Protect Against Check Fraud Losses".
http://famulus,msnbc.com/famuluscom/businesswire05-03-060041. asp??sym=sr.
http://www.mindgate.com/mindgate.html.
http://www.mindgate.com/print2mail/datadoorway.html.
"The Printing Process" http://www.microsoft.com//windows2000/en/advanced/help/default.asp?url=/windows2000/en/advanced/help/sag_PRINTconcept s_printing_process.htm.
"Print Spooler" http://msdn.nnicrosoft.com/library/default.asp?url=/library/en-us/gdi/prntspol_1xv6.asp.
"Clipboard Formats" http://msdn.microsoft.com/library/default.asp?url=/library/en-us/winui/winui/windowsuserinterface/dataexchange/clipboard/clipboardformats.asp.

* cited by examiner

ACCOUNT RECONCILEMENT - ISSUE INPUT FILE FORMAT - DATA TRANSMISSION
(File sent to bank)

| Customer Name | Account Number | Date |
|---|---|---|
| | | |

To ensure accurate implementation and/or timely revision, please supply the desired information and return to your Treasury Sales Officer within 10 days.

REQUIRED FILE SPECIFICATIONS

| File Type (check one)<br>☐ ASCII   ☐ EBC DIC | Record Length<br>80 | |
|---|---|---|

Data Field Content
    Character Only    All numeric fields are Right Justified Zero Filled (RJ/ZF).

HEADER RECORD FORMAT

The use of a Header Record must precede all Detail Records for this and each subsequent account.
On stacked accounts Header Records are required and must precede all Detail Records for this and each subsequent account.

| Position | Field Description | Field Size | Type |
|---|---|---|---|
| 01-20 | RECONCILIATIONHEADER (literal) | 20 | Alpha |
| 21-24 | Bank Number    DC - 0052, FL - 0003, GA - 0005, MD - 0014, NC - 0001, SC - 0004, VA - 0007, CT - 0020, TX, TN, AL, MS - 0028, DE - 0049, PA, NY, NJ - 0( | 04 | Numeric (RJ/ZF) |
| 25-37 | Account Number | 13 | Numeric (RJ/ZF) |
| 38-49 | Total Dollar Amount of File or all Zeros (without the decimal point) | 12 | Numeric (RJ/ZF) |
| 50-54 | Total Item Count of File or all Zeros (without the commas) | 05 | Numeric (RJ/ZF) |
| 55-80 | Filler    (check one)    ☐ zero    ☐ blank | 26 | Alphanumeric |

DETAIL RECORD    All standards are assumed unless otherwise indicated.

| Position Std. | Position Other | Field Description | Max. Field Size Std. | Max. Field Size Other | Type |
|---|---|---|---|---|---|
| 01-13 | | Account Number | 13 | n/a | Numeric (RJ/ZF) |
| 14-23 | | Check Serial Number | 10 | | Numeric (RJ/ZF) |
| 24-33 | | Check Amount (without the decimal point) | 10 | | Numeric (RJ/ZF) |
| 34-41 | | Issue Date (YYYYMMDD-std.) | 08 | | Numeric |
| 42 | | Void Indicator (V-std.)    Other (except X or -) | 01 | n/a | Alphanumeric |
| 43-72 | | Additional Data (SSN, payee name, etc.) | 30 | | Alphanumeric |
| 73-80 | | Filler (same as above) | 08 | | Alphanumeric |

To ensure the most expedient return of your reconcilement information, checks and bank statement, please transmit your input files immediately after checks are written.

| For technical assistance, please call your Customer Service Representative at 1-800-222-3862, option 795. | Format Approved: | |
|---|---|---|
| | Customer Signature | Date |
| | Customer Technical Contact (please print) | Phone |

Bank Use:    This customer-completed form MUST accompany all profiles used in account set-up.

*ardtin.xls revised 11/04*

METHOD AND SYSTEM FOR SENDING NOTIFICATION OF AN ISSUED DRAFT

CROSS-REFERENCED APPLICATIONS

This non-provisional application is a continuation in part of the non-provisional patent application Ser. No. 10/272,161 with inventors Kofman et al., entitled "DATA CAPTURE DURING PRINT PROCESS" filed Oct. 15, 2002, now U.S. Pat. No. 7,379,203 which is hereby incorporated by reference in its entirety. The aforementioned non-provisional application is a continuation in part of the non-provisional patent application Ser. No. 10/172,154 with inventors Kofman et al., entitled "PRINTING IN A SECURE ENVIRONMENT" filed Jun. 14, 2002, now U.S. Pat. No. 7,196,808 which is hereby incorporated by reference in its entirety. The aforementioned non-provisional application is a continuation in part of the non-provisional patent application Ser. No. 10/133,100 with inventors Kofman et al., entitled "MAPPING A PRINT STREAM FOR PRINTING ON MAILERS FROM A FIRST APPLICATION FOR INPUT TO A SECOND APPLICATION" filed Apr. 26, 2002, now U.S. Pat. No. 7,085,998 which is hereby incorporated by reference in its entirety. The aforementioned non-provisional application is based on the provisional patent application Ser. No. 60/367,118 with inventors Kofman et al., entitled "MAPPING A PRINTER STREAM FOR PRINTING ON POSTAL FORMS" filed Mar. 22, 2002, which is hereby incorporated by reference in its entirety.

The subject matter of the present application is related to the following commonly owned U.S. patents: U.S. Pat. No. 5,865,717, filed Jun. 7, 1995, issued Feb. 2, 1999 to Fabel for a Mailing Form for Non-impact Printing, U.S. Pat. No. 6,095,919, filed Oct. 27, 1998, issued Aug. 1, 2000 to Fabel for an Extendible Form for Non-impact Printer and U.S. Pat. No. 6,173,888, filed Feb. 2, 1999, issued Jan. 16, 2001 to Fabel for a Mailing Form for Non-Impact Printing. The subject matter of the present application is related to the following commonly owned U.S. application: U.S. application Ser. No. 09/557,492, filed Apr. 24, 2000, to Fabel for a Mailing Form for Non-Impact Printing. The U.S. Application and each of the U.S. Patents described above are hereby incorporated by reference in their entirety.

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

BACKGROUND OF THE INVENTION

1. Field of the Invention

This invention generally relates to the field of draft protection and more specifically to obtaining information of an issued draft from print stream data and alerting the drawee of the draft that the draft has been issued.

2. Description of Related Art

A "draft" is a written instruction to pay money and signed by the person giving the instruction. The instruction may be addressed to any person, including the person giving the instruction, or to one or more persons jointly or in the alternative. Each draft identifies a "drawee," the party on which an order for the payment of money is drawn and a "drawer," which is a person who signs or is identified in the draft as a person ordering payment. A "check" is a type of draft that is payable on demand and has a bank as its drawee.

Check fraud has been an ongoing problem since the use of checks began. Check fraud continues to increase at an alarming rate. Losses from check fraud are currently estimated to be over $10 billion annually. When determining liability, many courts look to see whether the banks have instituted fraud protection services/devices.

To combat check fraud, banks have instituted anti-fraud features, such as adding graphics, codes, color fibers, fluorescent fibers, micro printing, watermarks, and other authenticators to the check stock and/or background. These features help prevent and/or identify duplications of an original check. However, technology present in readily-available consumer electronics, such as photo-copiers, computers, and non-impact printers has kept pace with most currently-implemented anti-fraud security features used on or in conjunction with checks. Therefore, the previously-described security features printed in the check background are no longer effective because the forgers have access to the same basic check stock as the account holder and can closely reproduce the security features.

A recent innovation in banking security is a system commonly referred to as "Positive Pay". With Positive Pay, an account holder notifies the drawee (the banking institution i.e., one that draws, especially one that draws an order for the payment of money.) of the issuance of a check immediately after the check has been issued. A banking institution cooperating with a client under the Positive Pay system will only accept or pay checks that are pre-authorized. Creating fraudulent checks becomes useless under the Positive Pay system because the defrauder isn't able to register the counterfeit checks. Additionally, the system is not dependent on a teller identifying authenticators, such as those mentioned in the preceding paragraph.

However, most accounting software does not have the capability of automatically notifying a banking institution when a draft has been printed and/or issued. To add the feature, the software program would have to be customized to give it the ability to extract the required information from the accounting system and to transmit this information to a bank. One would have to re-key the software to support this functionality. Writing custom software to extract this information is very difficult, since most accounting software stores pieces of check information in multiple databases. Therefore, creating custom software is neither economical, timely, nor error proof. What is needed is a way to notify a bank of an issued draft without the need to customize third party and other types of accounting software.

Therefore, a need exists to overcome the problems with the prior art as discussed above.

SUMMARY OF THE INVENTION

Briefly, in accordance with the present invention, disclosed is a method and computer system for capturing draft information during a print process. In one embodiment, the present invention reads a spool file that contains draft information in response to a print command being executed by a software application. A portion of the draft information is then extracted from the spool file and an output file containing the portion of the draft information is generated.

In one embodiment, the extracted draft information is modified to conform to a template.

In another embodiment of the present invention, the output file includes at least one of an amount of the draft, a draft identifier, a payee identifier, a drawee identifier, or a drawor identifier and is sent to a drawee of the draft.

In one embodiment of the present invention, the spool file is written to the disk in Extended Metafile Format (EMF). The format of the output file is EMF if the spool file contains image information, and the format of the output file is text if the spool file does not contain image information.

In an embodiment of the present invention, at least one filler character is inserted into a payee identifier area of the template. In other embodiments, a pantograph is inserted into a payee identifier area of the template. The pantograph can go negative as it intersects characters of a payee's name in the payee identifier area, cover at least part of an area around a payee's name in the payee identifier area, or increase a distance between lines within the pantograph as the pantograph intersects with characters of a payee's name in the payee identifier area.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIG. 12 is an exemplary Account Reconcilement file in one embodiment of the present invention.

DETAILED DESCRIPTION OF THE PREFERRED EMBODIMENTS

I. Overview

A mailer is a consumable paper product that allows for quick and easy printing and mailing of information. A mailer can include an envelope, an insert and a return envelope, which may be created by folding the original document. One common use of mailers is to send checks. The commonly owned U.S. patents and U.S. application described above provide more information on mailers. A mailer allows a firm or small business to print directly onto one product all of the information necessary for mailing to a customer, client or employee. This is advantageous as it eliminates the separate printing of an envelope, an insert and a return envelope, as well as the need for the insertion of the return envelope and the insert into the envelope.

Typically, applications, such as QuickBooks, that provide information to be printed onto business forms support only those business forms that are provided by the same entity that provides the application. This is disadvantageous as it limits the range of business forms available to the users that are utilizing the application of the providing entity. The present invention allows additional manufacturers to provide business forms on which to print the information that is provided by these entities.

The present invention parses and remaps the print stream from a check writing or accounting application, automatically and transparently collates the information, reformats it to meet a particular financial institution's protocol, saves the information in one or more file locations, prints the check from blank stock, and ultimately transmits the information in real time or batch to the financial institution to notify them that a check has been issued.

II. System Architecture

Figure 1:
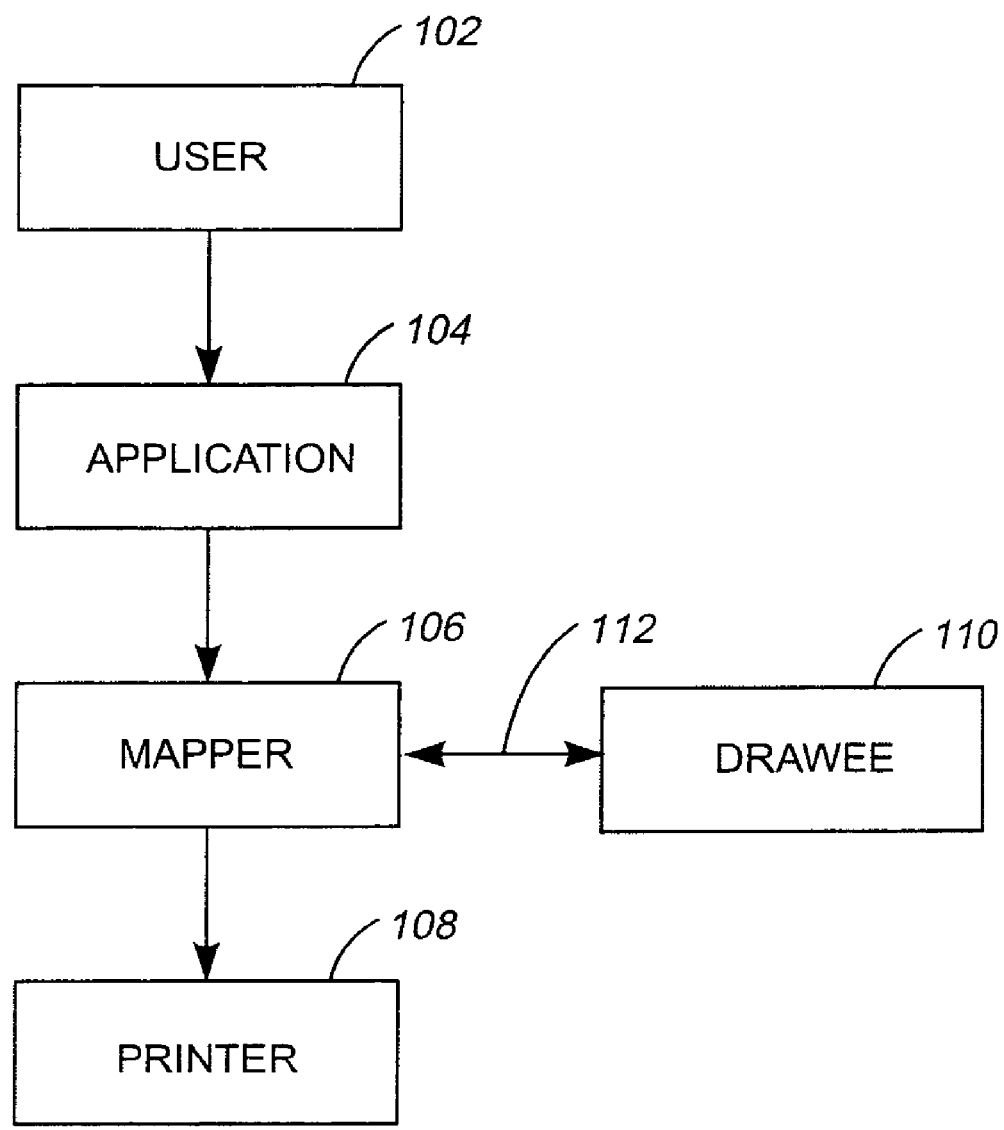
FIG. 1 is a block diagram illustrating the overall system architecture of one embodiment of the present invention.

FIG. 1 is a block diagram illustrating the overall system architecture of one embodiment of the present invention. A user 102 utilizes a client computer system to execute an application 104. A mapper 106 performs a mapping operation of the present invention, i.e., capturing a print stream and mapping to a business form or mailer, prints to a printer 108, and sends notification of the printed check to a drawee of the check 110. In an embodiment of the present invention, application 104 and mapper 106 execute on the same client computer system. In another embodiment of the present invention, application 104 and mapper 106 execute on separate computer systems that are connected via a network. An example network is described below.

The application 104 is a financial software application such as QuickBooks or Peachtree. In another embodiment of the present invention, application 104 is any application that routinely sends check information to a printer 108, such as a word processor or spreadsheet program.

The computer systems on which application 104 and mapper 106 execute comprise one or more Personal Computers (PCs) (e.g., IBM or compatible PC workstations running the Microsoft Windows 95/98/2000/ME/CE/NT/XP operating system, Macintosh computers running the Mac OS operating system, or equivalent), Personal Digital Assistants (PDAs), game consoles or any other computer processing devices. In another embodiment of the present invention, the computer systems on which application 104 and mapper 106 execute are one or more server systems (e.g., SUN Ultra workstations running the SunOS or AIX operating system or IBM RS/6000 workstations and servers running the AIX operating system). The printer 108 is a commercially available printer, such as a non-impact printer, a laser printer, an inkjet printer, a bubble-jet printer, a dot matrix printer, a thermal printer, or the like. The mapper 106 and drawee 110 are communicatively coupled to each other via a network 112. The network can be a circuit switched network, such as the Public Service Telephone Network (PSTN). In another embodiment of the present invention, the network is a packet switched network.

The packet switched network is a wide area network (WAN), such as the global Internet, a private WAN, a local area network (LAN), a telecommunications network or any combination of the above-mentioned networks. The network can be a wired network, a wireless network, a broadcast network or a point-to-point network. In one embodiment of the present invention, application 104, mapper 106 and printer 108 are connected via a network.

III. The Print Processing Operation

Figure 2:
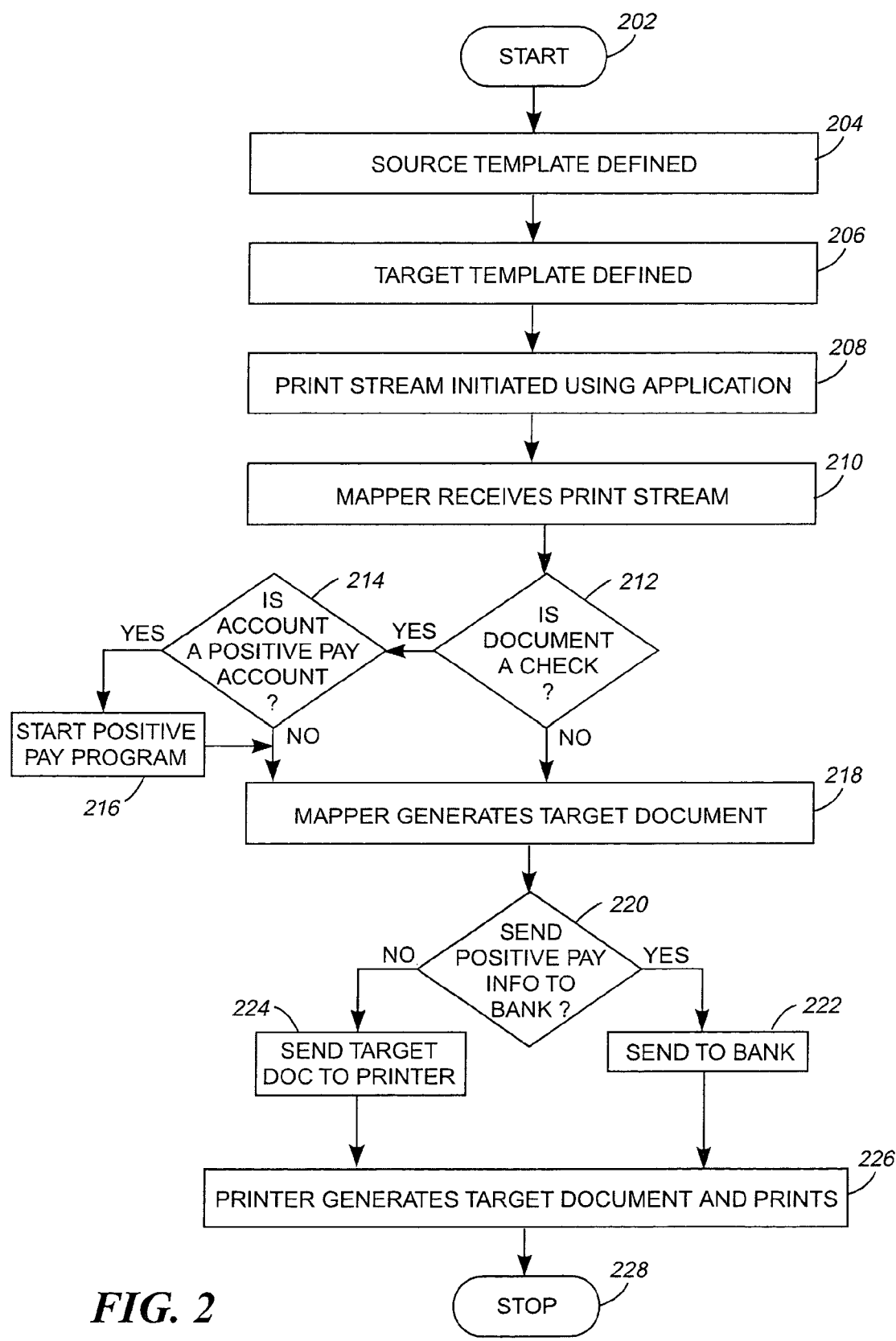
FIG. 2 is a flowchart depicting the operation and control flow of the overall process of FIG. 1 of the present invention.

FIG. 2 is a flowchart depicting the operation and control flow of the overall process of FIG. 1 of the present invention. The control flow of FIG. 2 begins with step 202 and flows directly to step 204. In step 204, a source template is defined. A source template is a file that defines the zones and content of a source document. Typically, the source document is a document including information that is directed to clients, customers or employees of a business and is generated by an application 104. Application 104 is, for example, a financial software application such as QuickBooks or Peachtree or any other software application containing financial or account information. In embodiments of the present invention, the source document is a check. Source templates and source documents are described in greater detail below (see FIG. 3 and FIG. 4).

In one alternative, the user 102 defines the source template using an application, such as one described below in greater detail (see FIG. 5). In another alternative, the source template is defined by another entity, such as a service provider or banking institution, separate from user 102. In this alternative, the service provider can be the same entity as the entity which provided the system of the present invention.

In step 206, a target, or destination template, is defined. A target template is a file that defines the zones and content of a target document. Target templates are described in greater detail below (see FIG. 6 and FIG. 7). In one alternative, the user 102 defines the target template using an application, such as one described below in greater detail (see FIG. 8). In another alternative, the target template is defined by another entity, such as a service provider or banking institution, separate from user 102. In this alternative, the service provider can be the same entity as the entity which provided the system of the present invention.

In an optional step after step 206, the user 102 defines set-up information. In this step, the user 102 defines information that is used in the printing process, described in greater detail below. Set-up information can include static information that is printed onto the business form or mailer. Static information is defined as information that is printed on a business form or mailer and that does not change over a set of business forms or mailers. Dynamic information, on the other hand, is defined as information that is printed on a business form or mailer and that may change over a set of business forms or mailers. For example, if a user 102 prints a set of mailers including a check to a customer, the static information includes such information as the return address on the mailer, the bank information on the check and the postage on the mailer. The dynamic information includes such information as the address on the mailer, the recipient's name and the amount of the check. Other examples of set-up information that may be specified by a user 102 in this optional step includes one or more of the following:

Positive Pay selection

Company logos

PC postage conforming to the Information-Based Indicium Program (IBIP) standard

Bar codes used to identify other information in the mailer, such as an account number, a check number or an invoice number Signatures printed on a letter or on a check Bank information conforming to the Magnetic Ink Character Recognition (MICR) standard and using a standard font, such as E13B MICR font, including:

Bank routing number

Bank account number

Check number

Account name

Account address

In an embodiment of the present invention, security measures are taken during the input and modification of set-up information. In this embodiment, a user is authenticated, such as via a login name and password, before he is able to input or modify set-up information. This allows sensitive information, such as one or more signatures printed on a check, to be protected from unauthorized access by a user.

In step 208, a print stream including a source document is initiated using application 104. Source documents are described in greater detail below. In one embodiment of the present invention, the user 102 issues a print command via application 104. In step 210, a mapper 106 receives the source document in the print stream data. The mapper 106 assembles information from one or more output print jobs from the application 104. It should be noted that in this document, the terms "file" and "document" are used interchangeably. Both terms are used to refer to a single sequence of bytes of finite length stored in a non-volatile storage medium.

In step 212, the mapper 106 determines whether the target document to be printed is a check. If the result of this determination is positive, control flows to step 214, where the mapper 106 determines whether the check is registered in a Positive Pay account. If the result of step 214 is positive, flow moves to step 216 where a Positive Pay program is invoked. Step 216 contains substeps, which are explained in detail below and shown in FIG. 11. Flow then moves to step 218. If the result of the determination of either step 212 or 214 is negative, control flows directly to step 218 without going to step 216.

In step 218, the mapper 106 generates the target document to be printed. This operation is described in greater detail below. In step 220, the system determines whether to send the stored Positive Pay information to a banking institution. If the determination is positive, the Positive Pay information is sent in step 222 and flow moves to step 224. If the determination in step 220 is negative, flow moves to step 224, where the information is sent to a printer 108. In step 226, the printer 108 receives the target document from mapper 106 and proceeds to print the target document. In step 226, the target document is printed onto a business form or mailer. In step 228, the control flow of FIG. 2 ceases.

IV. The Source Template

Figure 3:
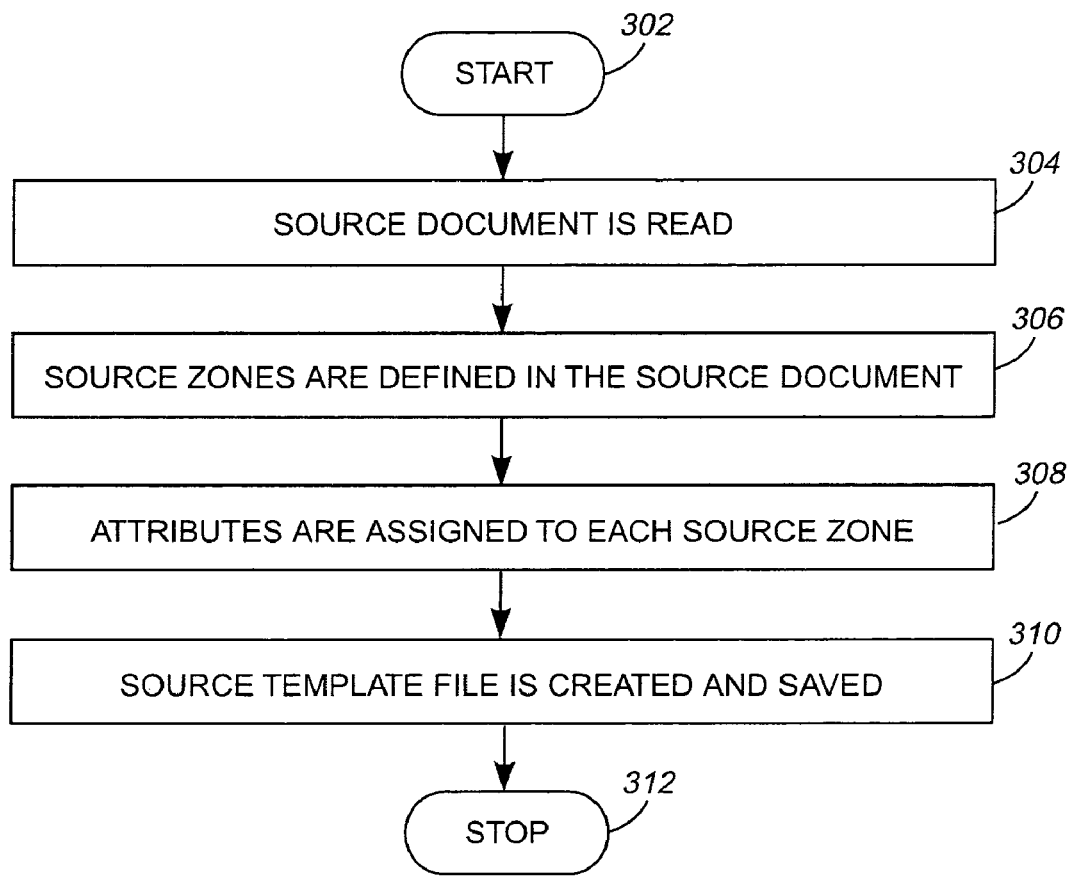
FIG. 3 is a flowchart depicting the operation and control flow of the source template generation process of FIG. 2 according to the present invention.

FIG. 3 is a flowchart depicting the operation and control flow of the source template generation process of FIG. 2, according to the present invention. FIG. 3 describes in more detail step 204 of FIG. 2. The control flow of FIG. 3 begins with step 302 and flows directly to step 304. In step 304, a source document is read by an application program used for generating a source template. Such an application is described in greater detail below in FIG. 5. It should be noted that the present invention supports various types of source documents. In an embodiment of the present invention, the source document is a document that contains check information. In addition, the source document is generated by an application 104. As explained above, application 104 is, for example, a financial software application such as QuickBooks or Peachtree or any other software application containing financial or account information. Thus, in this example, the source document is a billing statement, an account report, a check or the like.

In step 306, source zones are defined in the source document. A source zone is an area of a source document that provides content information that may be placed in a target document. The content information in a source zone is considered dynamic content information. Several types of source zones are defined, wherein each type of source zone contains a certain type of content information. The following are examples of source zone types:

Key Zone: Contains keywords associated with the source document

Text Zone: Contains text

Picture Zone: Contains an image

Table Zone: Contains a table or other tabular data

Address Zone: Contains a mailing address

In step 308, attributes are assigned to each source zone. Examples of attributes that may be assigned to a source zone are the name of a source zone, the location of a source zone (expressed in pixel coordinates) and the format of the content information in the source zone.

In step 310, a source template file is generated and saved. The source template file contains, at a minimum, a list containing each source zone and the pixel coordinates defining the location of each source zone in the source document. The source template file is a text file, an HTML file, an SGML file, an XML file, or any other file format conducive to holding a hierarchical structured data set. An example of a source template file written in text format, is shown below:

[Zones]
key1=key,5.991,0.719,1.011,0.146!
address=text,0.865,0.146,2.563,1.323!
bill to=text,0.542,1.833,3.365,1.198!
date=text,6.002,0.938,0.844,0.198!
invoice=text,7.116,0.917,0.761,0.208!
terms=text,5.117,3.683,1.2,0.317!
project=text,6.418,3.646,1.532,0.365!
total=text,6.95,9.51,1.011,0.354!
note=text,0.05,9.482,5.408,0.425!
description=text,1.032,4.396,4.428,0.604!
quantity=text,0.479,4.406,0.479,0.604!
rate=text,6.418,4.396,0.26,0.604!
amount=text,7.429,4.406,0.448,0.625!
pono=text,3.959,3.656,1,0.354!
key_invoice=key,6.845,0.177,1.115,0.292!
key_quantity=key,0.042,4.125,0.875,0.198!

In step 312, the control flow of FIG. 3 ceases.

Figure 4:
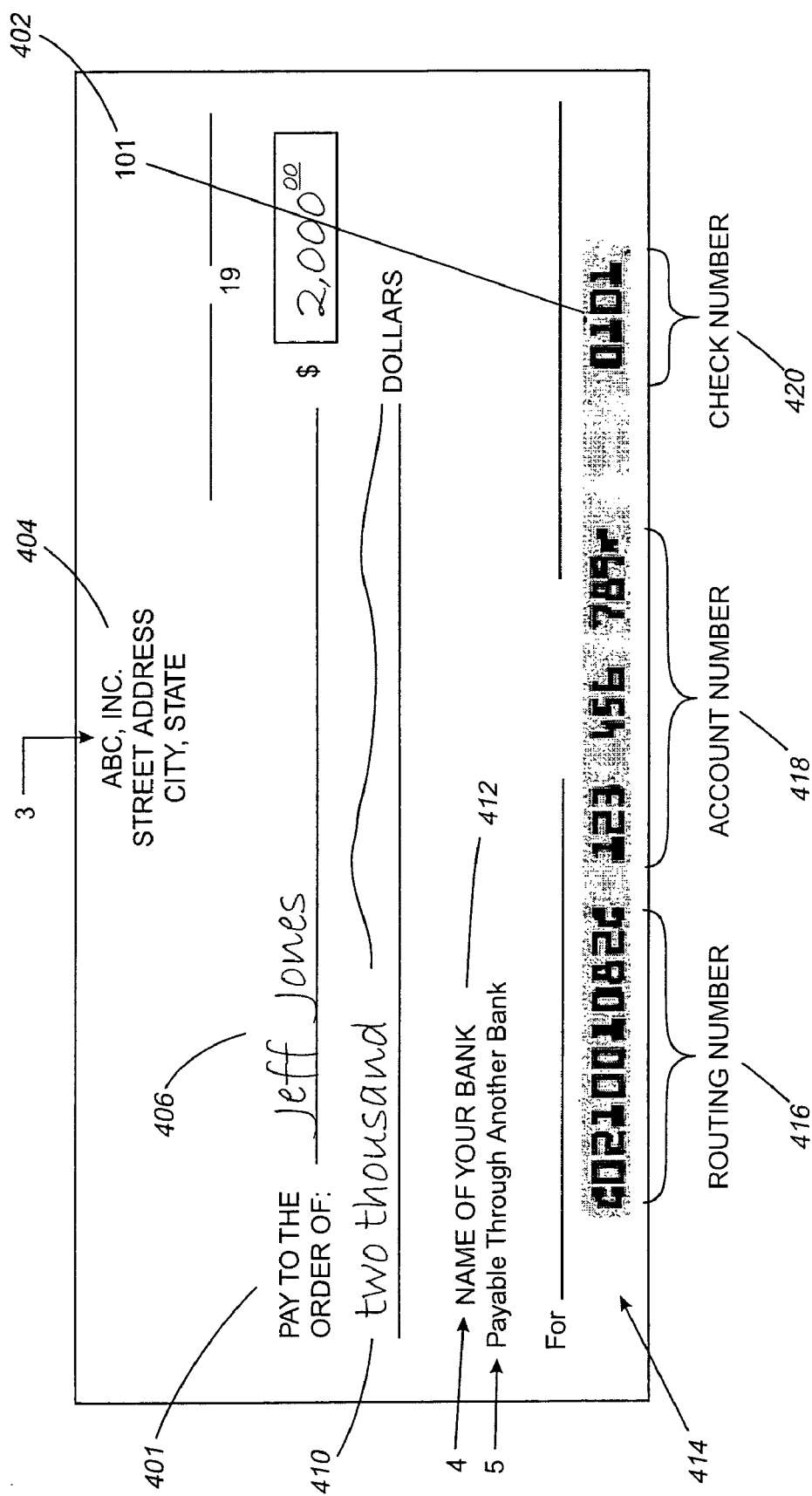
FIG. 4 is a representation of a source document, of FIG. 3 of the present invention.

FIG. 4 is a representation of a source document, of FIG. 3 of the present invention. As described above, a source document is any document that is printed from application 104. Specifically, a source document is a document that contains financial or account information that the user 102 desires to access.

In FIG. 4, the source document is a check that is printed from a financial management software application, such as QuickBooks. The source document of FIG. 4 shows "pay to the order of:" text 401. FIG. 4 also shows a check number 402 for identifying the particular check out of a series of checks.

The check also shows the account holder's name and address 404 on top of the check. The name of the payee 406 is near the center of the check. Adjacent the payee's name is a dollar amount 408 of the check and below the payee name 406 is a verbal description 410 of the dollar amount 408. The check of FIG. 4 also shows the name and address of the drawee 412. FIG. 4 also shows what is referred to as a MICR (Magnetic Ink Character Recognition) line 414 that is comprised of a routing number 416, and account number 418, and a check number 420 that includes the same number as in field 402.

The present invention is able to print a MICR line on blank stock, thereby providing the advantage of allowing businesses to avoid having a supply of MICR encoded checks, which are susceptible to being stolen, at the place of business. One embodiment of the present invention provides the ability to MICR encode blank check stock by integrating with official bank sites that serve MICR line to clients on demand. The present invention is advantageous to banking facilities, as it allows them to preplan cash placements based upon checks issued.

Figure 5A:
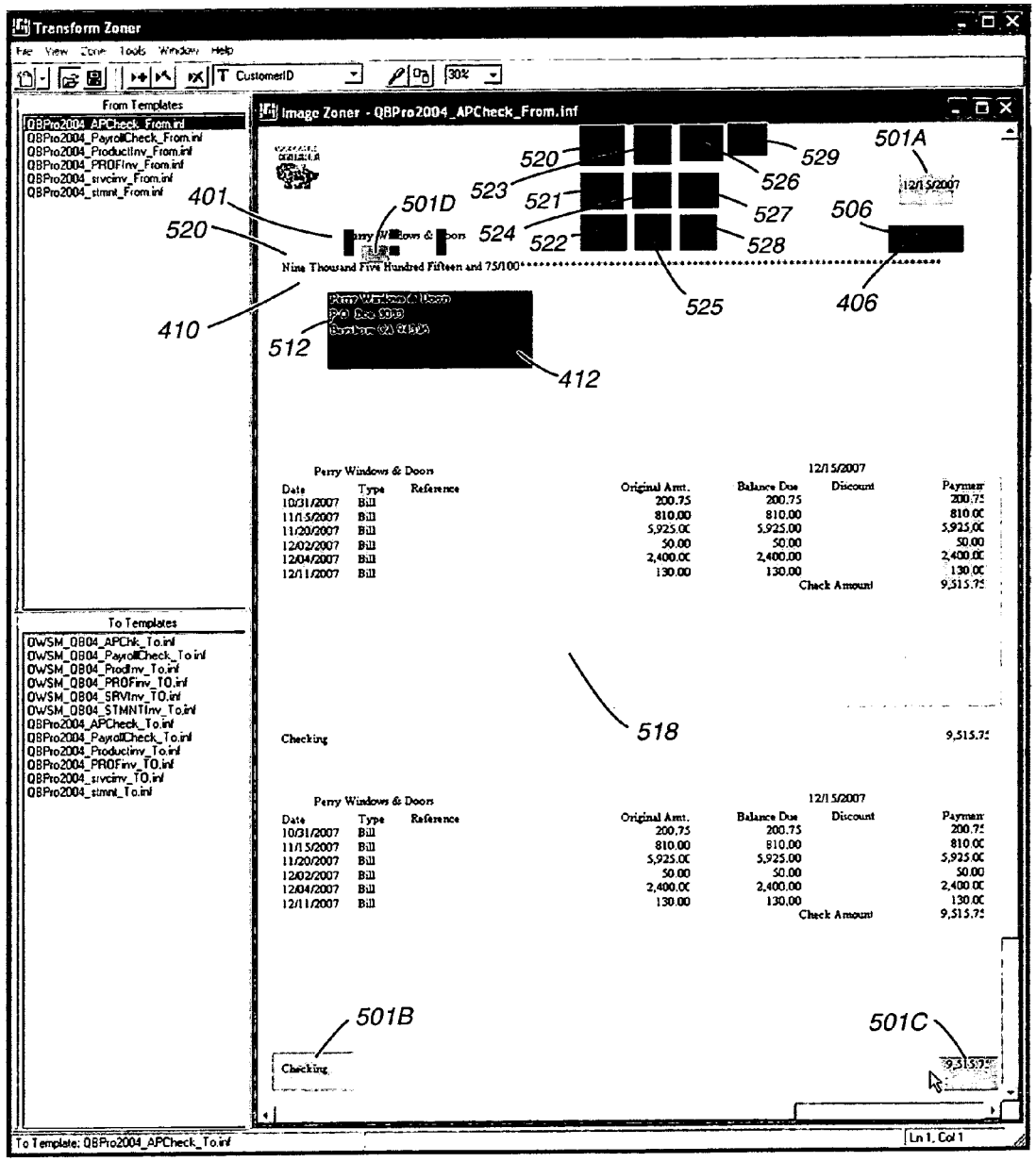
FIG. 5A is a screenshot of one embodiment of a GUI of an application of FIG. 3 used for generating a source template of the present invention.
Figure 5B:
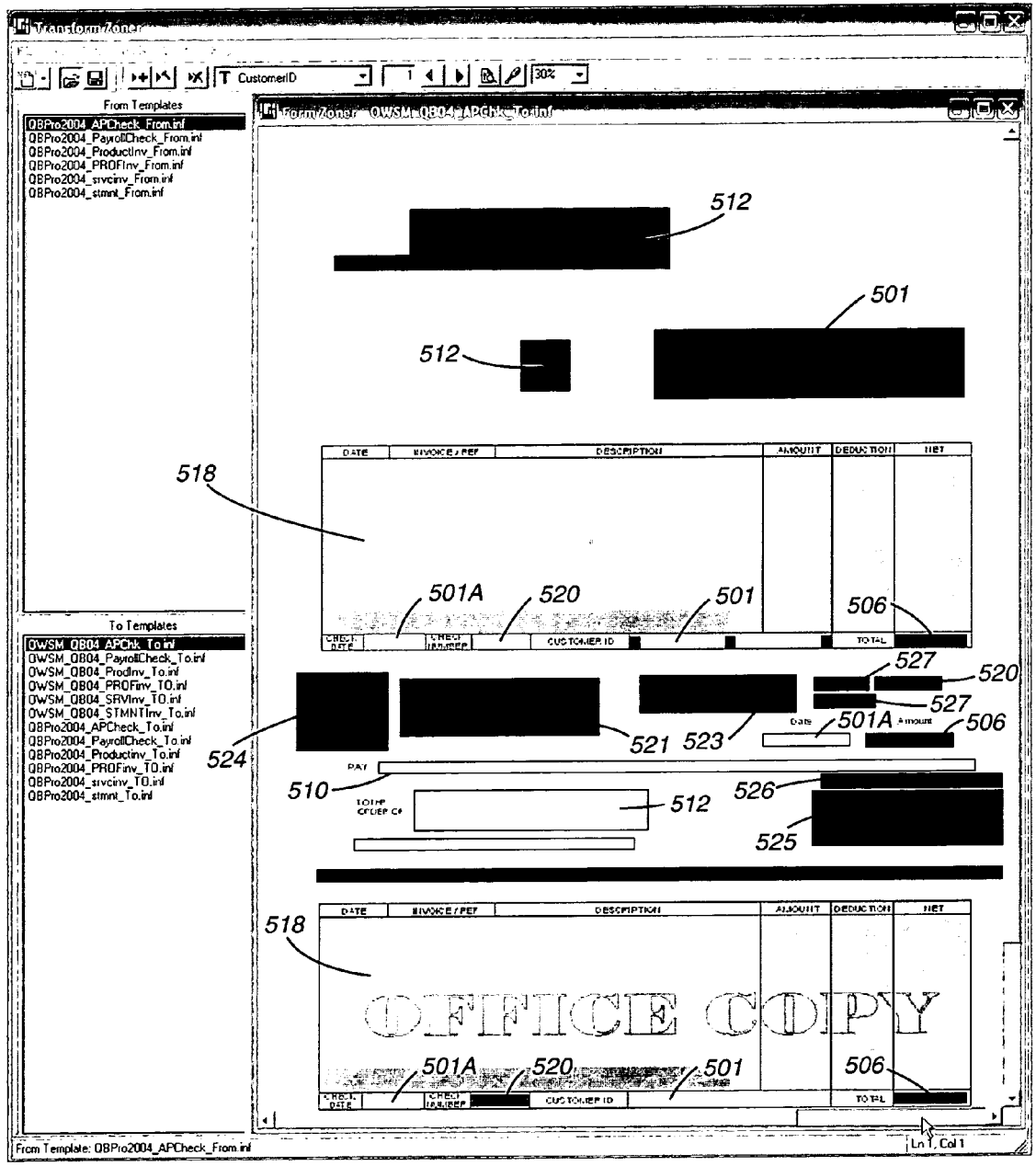
FIG. 5B is the remapped output of the source template of FIG. 5A, according to the present invention.

FIG. 5A is a screenshot of one embodiment of a Graphical User Interface (GUI) of an application of FIG. 3 used for generating a source template for a check. FIG. 5B is the remapped output of the source template of FIG. 5A, according to the present invention. The GUI of FIG. 5A is used for performing the steps 306 and 308 of FIG. 3. The GUI shows that the check of FIG. 4, the source document, is graphically displayed in the window of FIG. 5A. A user or programmer utilizing the GUI of FIG. 5A proceeds to select areas of the check using a highlighted box and then specify the type of source zone that is associated with that area. Based on the type of source zone selected for each area, the mapper 106 processes the data in each source zone in a particular way. This is described in greater detail below.

FIG. 5A shows that the user or programmer has created highlighted box 501a-d. 501a, 501b, 501c, and 501d are Key Zones that pickup Payee and text information. The four separate pixel locations allow the template to be more accurately defined. Box 501a is a draw box that is defined by the user or programmer as a Key Zone that defines the check date. Box 501b is a draw box that is defined by the user or programmer as a Key Zone that check-indicative text, such as "Checking." Box 501c is a draw box that is defined by the user or programmer as a Key Zone that defines the check amount. Box 501d is a draw box that is defined by the user or programmer as a Key Zone that defines the check amount description and 410 is the corresponding data. Box 510 is defined as a Text Zone because box 510 contains text describing the dollar amount of the check. A highlighted box 512 has been created over the drawee name and address 412. Box 512 is defined as a Name and Address Zone because box 512 clearly contains a name and address.

In addition, drawn box 504 defines the Payee Address, Pay to the order of and Postnet Barcode (field type US Address). Draw box 508 is the corresponding data within box 504. Drawn box 506 defines the check amount and 510 is the corresponding data. Box 506 is defined as an Number Zone because box 506 contains the amount to be paid to the payee. Drawn box 518 defines the Voucher Stub area. Data in the Voucher Stub area is organized in table format to provide for precise printing.

FIG. 5A shows 10 boxes 520-529 at the top that represent and define external (external to print stream) data that is to be merged at the printer. In the embodiment shown, box 520 is the check number; box 521 is the Account Holder address; box 522 is the Routing Number; box 523 is the Bank Address; box 524 is the Logo; box 525 is the Signature; box 526 is the Legend, which in one embodiment, renders the check invalid if it is above a specified dollar amount; box 527 is a Fractional Number (e.g., 131/34); box 528 is the Account Description (e.g., client escrow account); and box 529 is the Account Number.

As you can be seen from FIG. 5A and the description above, the only information that is printed from accounting software is the payee, amount, address, date and payment detail.

As explained above for step 310 of FIG. 3, once the source document is fully defined using the highlighted boxes, a source template file is generated. An example of a source template file, in text format, is shown above.

V. The Target Template

Figure 6:
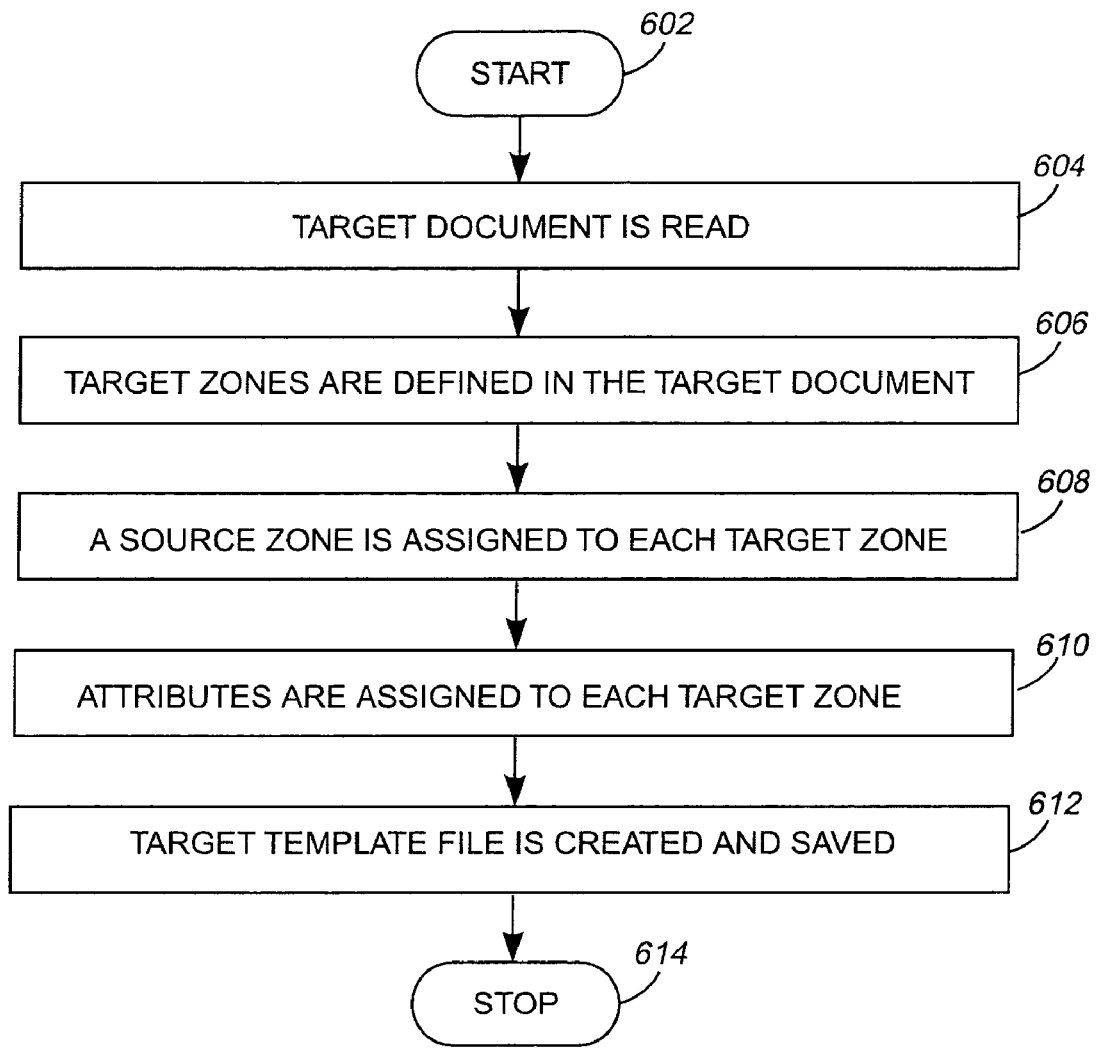
FIG. 6 is a flowchart depicting the operation and control flow of the target template generation process of one embodiment of the present invention.

FIG. 6 is a flowchart depicting the operation and control flow of the target template generation process of one embodiment of the present invention. FIG. 6 describes in more detail step 206 of FIG. 2. The control flow of FIG. 6 begins with step 602 and flows directly to step 604. In step 604, a target document is read by an application program used for generating a target template. Such an application is described in greater detail below in FIG. 8. It should be noted that the present invention supports various types of target documents. Typically, the target document is a document containing the information from a source document and which is printed onto a business form or mailer. As explained above, the source document can be an invoice due, a payroll record, an account statement, a billing statement, a report, a check or the like. Thus, the target document will contain any such information. In embodiments of the present invention, the source document is a check. An example target document is shown below in FIG. 7.

In step 606, target zones are defined in the target document. A target zone is an area of the target document in which content information from the source document is placed. Several types of target zones are defined, wherein each type of target zone contains a certain type of content information. The following are examples of target zone types:

Key Zone: Contains keywords associated with the source document

Text Zone: Contains text

Picture Zone: Contains an image

Table Zone: Contains a table or other tabular data

Address Zone: Contains a mailing address

Locked Zone: A zone on the target document that is locked and may not be overwritten with any data Postage Zone: Contains PC postage In step 608, a source zone is assigned to each target zone. In this step, the source content for each target zone is defined. As explained above, a target zone defines an area in which content from a source document is placed. Thus, in this step, the content from a source document, defined as a source zone, is linked to each target zone. This is explained in greater detail below.

In step 610, attributes are assigned to each target zone. The following attributes are supported for each target zone:

Parameters: Pixel coordinates defining the location of the target zone

Alignment: The horizontal or vertical alignment of the content in the target zone Font: The font of any text that will be entered into the target zone Expand/Crop Image: If the target zone is an Image Zone, this describes how to expand or crop the image Image rotation: This describes how to rotate the image In step 612, a target template file is generated and saved. The target template file contains, at a minimum, a list containing each target zone, the pixel coordinates defining the location of each target zone in the target document and the source zone corresponding to each target zone. The target template file is a text file, an HTML file, an SGML file, an XML file, or any other file format conducive to holding a hierarchical structured data set. An example of a target template file written in text format, is shown below:

[Lock]
[Zones]
address=4.506,1.972,3.494,1.826,Crop,180,Right,Bottom,,,0,Times New Roman!10!
date=0.73,5.54,1.46,0.209,Crop,0,Center,Top,,,,Times New
Roman!10!;5.737,6.78,0.855,0.156,Crop,0,Left,Top,,,0,
Times New Roman!8!
invoice=0.73,5.874,1.471,0.198,Crop,0,Center,Top,,,,
Times New
Roman!10!;5.747,6.927,0.855,0.146,Crop,0,Left,Top,,,,
Times New Roman!8!
description=0.428,4.382,3.588,0.855,Crop,0,Left,Top,,,0,
Times New
Roman!7!;3.035,7.355,2.91,1.002,Crop,0,Left,Top,,,,
Times New Roman!8!
amount=4.057,4.382,0.741,0.876,Crop,0,Right,Top,,,0,
Courier
New!7!;7.28,7.355,0.793,1.002,Crop,0,Right,Top,,,0,
Courier New!8!
quantity=1.773,7.355,0.615,1.002,Crop,0,Center,Top,,,0,
Courier
New!8!;2.42,7.355,0.584,1.002,Crop,0,Center,Top,,,0,
Courier New!8!
bill to=1.439,0.115,3.87,1.596,Crop,180,Right,Bottom,,,0,Times New
Roman!10!;2.545,5.613,2.274,0.824,Crop,0,Left,Top,,,,
Times New
Roman!9!;0.407,8.67,4.819,2.045,Crop,0,Left,Top,,,0,
Times New Roman!10!
total=4.057,5.268,0.741,0.136,Crop,0,Right,Top,,,0,Courier
New!7!B;7.468,9.097,0.605,0.167,Crop,0,Right,Top,,,0,
Times New Roman!7!
pono=7.468,6.906,1.001,0.219,Crop,0,Left,Top,,,,Times New Roman!8!
rate=5.956,7.355,0.772,1.002,Crop,0,Right,Top,,,0,Courier New!8!

In step 614, the control flow of FIG. 6 ceases.

Figure 7:
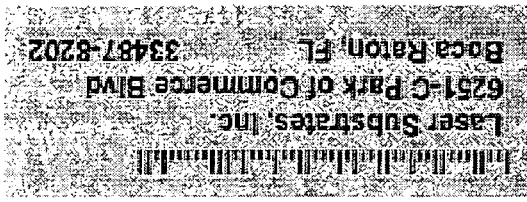
FIG. 7 is a representation of a target document of FIG. 6, in one embodiment of the present invention.

FIG. 7 is a representation of a target document of FIG. 6, in one embodiment of the present invention. As described above, a target document is a business form or mailer such as those described by the section entitled Cross Referenced Applications and each incorporated herein in their entirety. The mailer of FIG. 7 is a check form that is used to print issued checks.

Note that the mailer of FIG. 7 already includes information including a return address and other text. In an embodiment of the present invention, the information present in the mailer of FIG. 7 is static information that is specified by the user 102 in an optional step after step 206 of FIG. 2. This is described in greater detail above. In one alternative, the static information is pre-printed onto the mailer before the process of FIG. 2 is executed. This is advantageous in instances where the user 102 does not have the ability to print certain articles, such as magnetic ink or color logos. In another alternative, the static information is printed onto the mailer at the time that the dynamic information is printed onto the mailer in step 216 of FIG. 2.

In any case, the empty areas of the mailer of FIG. 7 will be populated with dynamic information—that is, the content extracted by the source document—in step 214 of FIG. 2. This process is described in greater detail below.

The target document of FIG. 7 shows a customer identification area 702 for identifying the party receiving the mailer. FIG. 7 also shows an invoice number column 704 for indicating the invoice number for each item purchased and an item amount column 706 for indicating the cost of each item purchased. Column 704 corresponds to column 710 and column 706 corresponds to column 712 as the client account statement duplicates this information in the target document. The total amount 708 indicates the combined cost of all items purchased. Cell 708 corresponds to cell 714.

Figure 8:
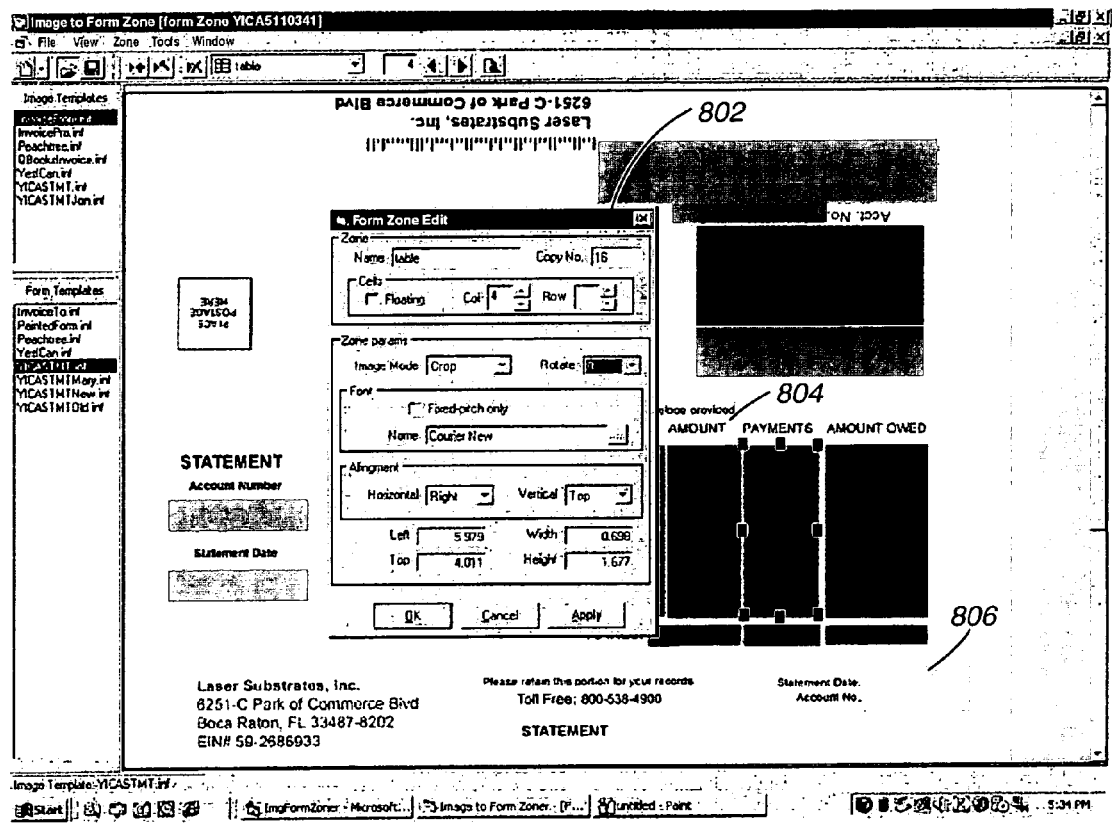
FIG. 8 is a screenshot of one embodiment of a GUI of an application used for generating a target template of FIG. 6, according to the present invention.

FIG. 8 is a screenshot of one embodiment of a GUI of an application used for generating a target template, according to the present invention. The GUI of FIG. 8 is used for performing the steps 606-610 of FIG. 6. The GUI of FIG. 8 shows that a sample target document is graphically displayed in the window of FIG. 8. A user or programmer utilizing the GUI of FIG. 8 selects an area in the target document using a highlighted box and then specifies the type of target zone that is associated with that area. A list of target zones is given above. Further, the user or programmer also defines for each target zone the content that shall be entered into that area. That is, each target zone is assigned a source zone from which content is used to populate the target zone. The user accomplishes this by selecting for each target zone a source zone from a master list of source zones. The master list is created during the process of source template generation, such as described in FIG. 3. Based on the source zone selected for each target zone, the mapper 106 populates each target zone accordingly. This is described in greater detail below.

FIG. 8 illustrates that the user or programmer has created a highlighted box 804 over an item amount column for indicating the cost of each item purchased. Box 804 is defined by the user or programmer as a Table Zone because box 804 contains a table of information regarding item costs. A highlighted box 806 has been created over the total amount cell for indicating the combined cost of all items purchased. Box 806 is defined as a Text Zone because box 806 contains simple text.

In an embodiment of the present invention, in addition to specifying the source zone associated with each target zone, the user or programmer can also specify attributes for each target zone. For example, using the pop-up GUI 802, the user or programmer can modify various attributes of each target zone. Pop-up GUI 802 shows that the following target zone attributes can be specified: the location of the target zone, the alignment of the text in the target zone, the font of the text in the target zone, the manner in which to expand or crop an image that shall be placed in the target Image Zone and the manner in which to rotate an image that shall be placed in the target Image Zone.

In an embodiment of the present invention, the GUI 802 also includes a check box 810 that defines the target template file as a Positive Pay file. Information in templates marked as Positive Pay files will be saved for later transmission to a banking institution. The significance of checking this box will be explained in more detail below. If the box is checked, further input fields will be presented to the user for entering the corresponding banking institution and transmission details, such as internet address, file format, and encryption methods. This information will be stored in a memory location for later use.

In an embodiment of the present invention, once the target document is fully defined using the highlighted boxes and pop-up GUI 802, a target template file is created. The target template file contains, at a minimum, a list of each target zone, the location of each target zone and the source zone associated with the target zone. An example of a target template file, in text format, is shown above.

VI. The Mapper

Figure 9:
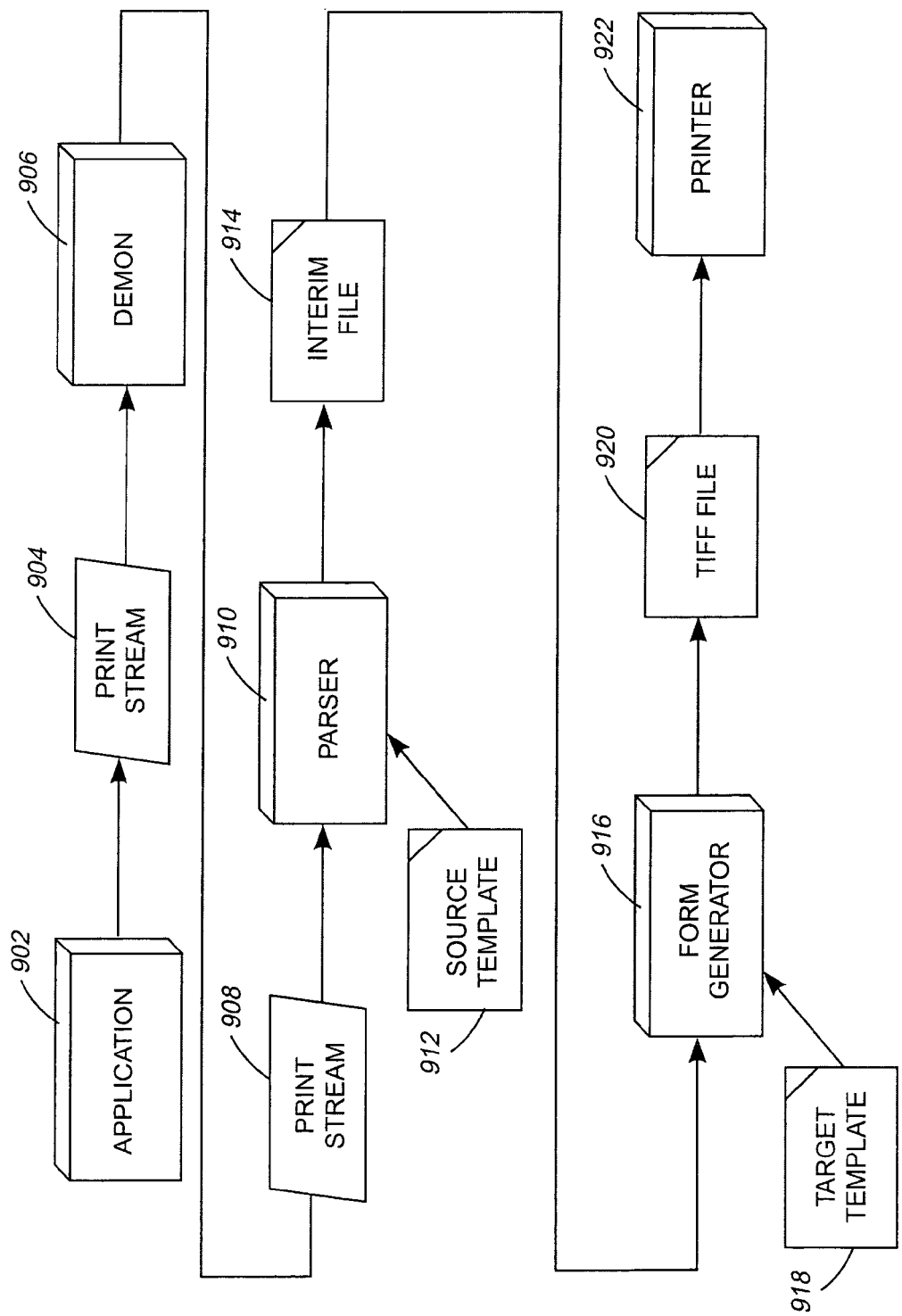
FIG. 9 is a functional diagram illustrating the mapping process of FIG. 1 according to one embodiment of the present invention.

FIG. 9 is a functional diagram illustrating the mapping process of FIG. 1 according to the present invention. FIG. 9 provides more detail of the process represented by step 218 of FIG. 2. FIG. 9 shows that an application 902, corresponding to application 104, has sent a print stream 904 containing a source document. The print stream 904 is subsequently captured by a demon 906. A demon 906 is an application program that resides on a client computer system for the purpose of performing a specified process at a predefined time or in response to a particular event. The demon, in one example, is a specialized printer driver. In this case, demon 906 receives the print stream 904, initiates the mapper 106 and redirects the print stream 904 as print stream 908 to the mapper 106. Mapper 106 is represented in FIG. 9 by functional block 910 representing the parser function and functional block 916 representing the form generating function. In an embodiment of the present invention, demon 906 is not present. In this embodiment, the print stream 904 is received directly by parser 910 from application 902.

The first operation performed by mapper 106 is the parsing of the print stream 908 by parser 910 using the source template 912, which was defined in the process of FIG. 3. In an embodiment of the present invention, parser 910 converts the format of the print stream 908 to a TIFF file format before parsing. In any event, the product of the operation of parser 910 is an interim file 914 containing the content that has been extracted from the print stream 908 in accordance with the source template 912. In an embodiment of the present invention, interim file 914 is a text file containing a list of source zones and the content contained in each source zone. In this embodiment, the interim file 914 is similar to the example source template file in text format shown above in the section entitled Source Template.

Form generator 916 receives interim file 914 and proceeds to populate the target template 918 using the content contained in interim file 914. The target template 918 defines the manner and format in which the content shall be entered into the specified target zones of the target template 918, as described in FIG. 6 above. The product of form generator 916 is a TIFF file 920. The TIFF file 920 is then sent to printer 922 for printing.

Figure 10A:
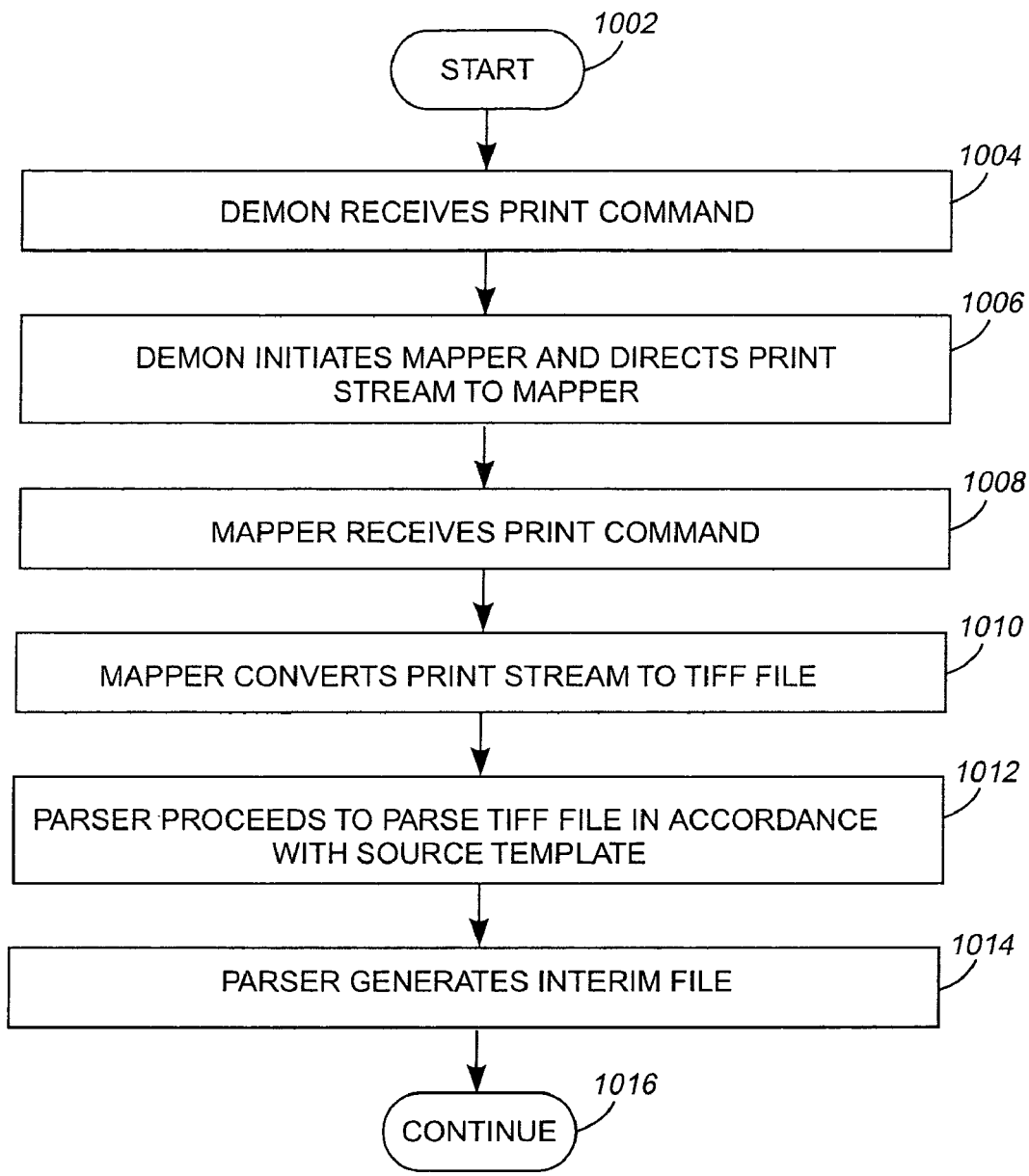
FIG. 10A is a flowchart depicting the operation and control flow of the mapping process of FIG. 8 according to the present invention.
Figure 10B:
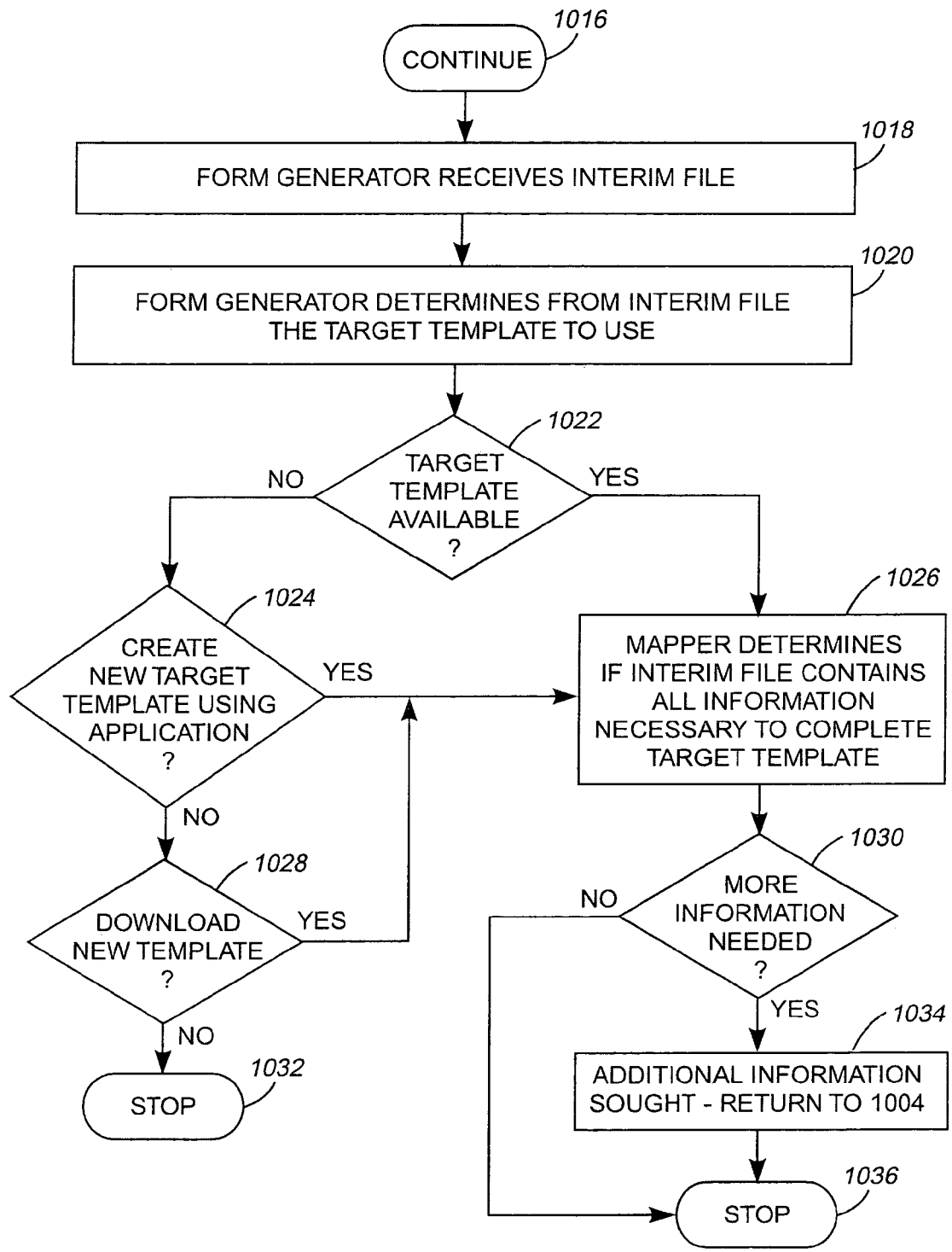
FIG. 10B is a continuation flowchart if FIG. 10A, in one embodiment of the present invention.

FIGS. 10A, 10B and 10C are flowcharts depicting the operation and control flow of the mapping process of one embodiment of the present invention. FIGS. 10A, 10B and 10C provide additional detail of the process represented by step 210 of FIG. 2. The control flow of FIGS. 10A, 10B and 10C begins with step 1002 and flows directly to step 1004. In step 1004, the demon 906 receives the print stream 904. In step 1006, the demon 906 initiates the matter 106 and redirects the print stream 904, now print stream 908, to the mapper 106. In step 1008 the parser 910 of mapper 106 receives the print stream 908. In step 1010, in an embodiment of the present invention, parser 910 converts the format of the print stream 908 to a TIFF file format before parsing.

In step 1012, the parser 910 of mapper 106 parses the print stream 908 in accordance with a predefined source template 912. In this step, the parser 910 performs a modified Optical Character Recognition (OCR) procedures on Text Zones of the source document as defined by the source template 912. In addition, the parser 910 generates image format copies for all other specified source zones of the source document as defined by the source template 912. The OCR procedure of the present invention is a modified OCR because the document is never in a physical form that can be seen, as is the case with traditional OCR procedures. The OCR of the present invention is an interpretation of the electronic document based one instructions and indicators as to how the document will look, once it is printed.

In step 1014, the output of step 1012 is an interim file 914 that contains all content (image, text, etc.) extracted from the source document. Control flows from step 1014 to step 1016 and immediately continues with step 1018 of FIG. 10B.

In an embodiment of the present invention, the parser 910 of mapper 106, in step 1012, determines the source template 912 to use for each particular source document by performing OCR in Key Zones of the source document. The parser 910 subsequently attempts to match the text extracted from a Key Zone with text defined in source templates 912. Once a match is made, the corresponding source template 912 is used to parse the source document. This is useful when there are multiple source templates 912 defined for source documents.

In step 1018, the form generator 916 receives interim file 914. In step 1020, the form generator 916 determines from the interim file 914 the target template 918 to use in generating a target document. The form generator 916 makes this determination by reviewing the text found in a Key Zone or related source zone in the source document. The form generator 916 subsequently attempts to match the text extracted from a Key Zone in the source document with text defined in target templates 918. Once a match is made, the corresponding target template 918 is used to create the target document. This is useful when there are multiple target templates 918 defined for target documents.

In step 1022, the form generator 916 determines whether the appropriate target template 918 (chosen as the appropriate target template 918 in step 1020) is available. If the result of this determination is positive, the form generator 916 accesses the appropriate target template 918 and control flows to step 1026. If the result of this determination is negative, control flows to step 1024. In step 1024, the form generator 916 determines whether an appropriate target template 918 can be produced using an application, such as the target template generation application described in FIG. 8. If the result of the determination of step 1024 is positive, a user or a programmer uses an application such as described in FIG. 8 to produce the appropriate target template 918 and control flows to step 1026. If the result of the determination of step 1024 is negative, control flows to step 1028. In step 1028, the form generator 916 determines whether an appropriate target template 918 can be downloaded from a web site or other entity via a network. If the result of the determination of step 1028 is positive, the appropriate target template 918 is downloaded and control flows to step 1026. If the result of the determination of step 1028 is negative, control flows to step 1032 and stops.

In step 1026, the form generator 916 reviews the information interim file 914 and compares it to the information required to complete the target template 918. In step 1030, the form generator 916 determines whether the interim file 914 contains all of the information necessary to complete the target template 918. If the form generator 916 determines that more information is necessary, the form generator 916 seeks the required information and control flows to step 1034. If the form generator 916 determines that more information is not necessary, control flows to step 1036 and the process stops.

If the form generator 916 determines that more information is necessary, control flows to step 1034, where the mapper 106 automatically seeks the required information. Mapper 106 can accomplish this task by searching for a file or data set that contains the required information. Alternatively, the mapper 106 can communicate to application 104 the data that it requires and subsequently receive the required information from the application 104. In another embodiment, the mapper 106 can prompt the user 102 to provide the required information by providing another print stream that contains the required information. As explained above, the mapper 106 can communicate with the user 102 via a pop-up window that describes to the user 102 the required information. Control flows from step 1034 to step 1036 and stops.

VII. Positive Pay

FIG. 2, steps 212-224 depicts the operation and control flow of the Positive Pay process according to one embodiment of the present invention. In step 212 a determination is made as to whether or not the document being printed is a check. This determination can be performed by searching for specific characters that are indicative of a check, such as "pay to the order of" or an account number. The present invention can also match field information and/or spatially match field locations to determine whether or not it is a check that is being printed. For example, if a name is in the middle of the document, a dollar amount is spatially adjacent the name on the document, and a dollar amount descriptive field below, the document can safely be assumed to be a check. The present invention could also key of off the rectangular shape of the document or other indicia.

Once the printed document is determined to be a check, it must then be determined whether or not the check is issued from a Positive Pay account. That is, is Positive Pay used for this particular checking account? In one embodiment of the present invention, the account number that accompanies the check information is compared to an account number stored in memory. If the numbers match, the check is known to be a Positive Pay check. In other embodiments, once the mapper 106 receives the print stream (in step 210 in FIG. 2), it pulls up the corresponding template for the document contained in the print stream. If the source document has been defined as a Positive Pay document, the corresponding template will also be flagged as a Positive Pay template.

Figure 11:
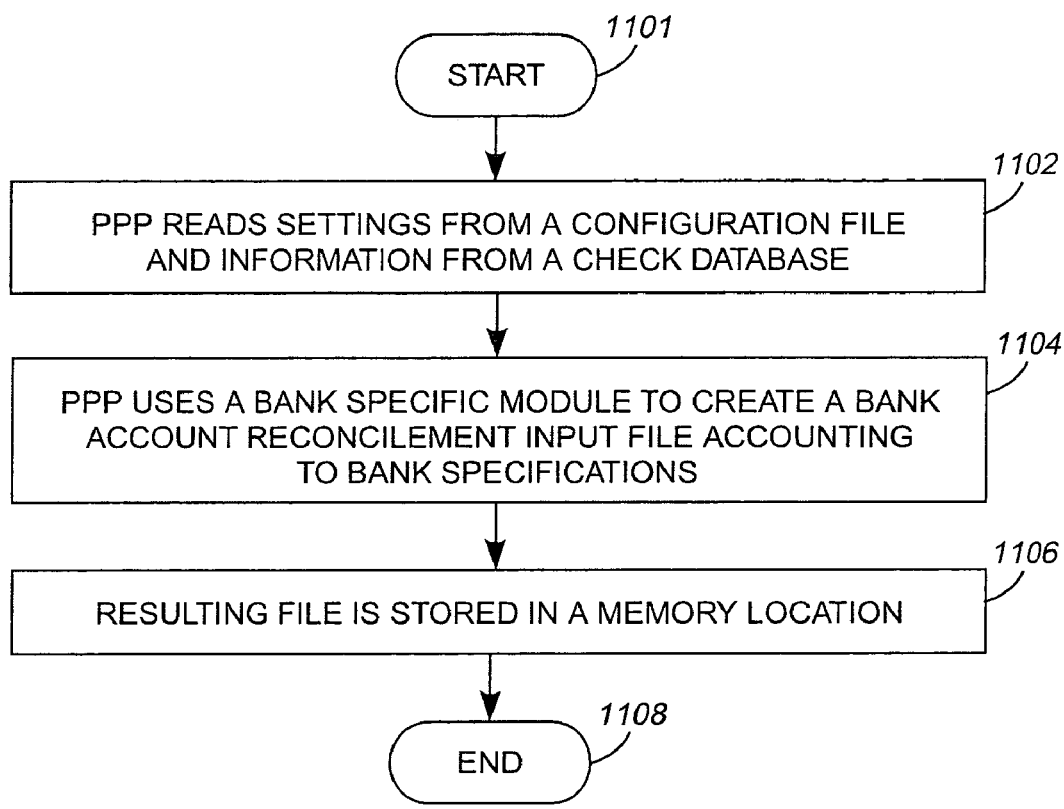
FIG. 11 is a flowchart illustrating substeps within step 216 of FIG. 2 according to the present invention.

If the check is issued from a Positive Pay account, a Positive Pay Program (PPP) is initiated in step 216. FIG. 11 is a flowchart depicting the operation and control flow of the Positive Pay process of one embodiment of the present invention. FIG. 11 provides additional detail of the process represented by step 216 of FIG. 2. The control flow of FIG. 11 begins with step 1101 and flows directly to step 1102. In step 1102 the PPP reads settings (e.g. bank specific module name) from a configuration file and information (e.g. bank number) from a check database. The PPP then uses a bank specific module (e.g. WachoviaPP) to create a bank Account Reconcilement input file according to bank specifications in step 1104. The resulting file is then stored in a memory location in step 1106. The flow ends at step 1108. As show in the illustration of FIG. 2, the Account Reconcilement file is eventually sent to the appropriate bank via any communication means supported by the banking institution. The Account Reconcilement file can be sent individually, or sent with other files as a batch transmission.

FIG. 12 shows a sample Account Reconcilement input file 1200 as would typically be sent to a banking institution. File 1200 is exemplary only and is not meant to limit the present invention to any particular format. In one embodiment of the present invention, the Account Reconcilement file is sent via IP/Internet based file transfer system running on Unix based hardware and supporting FTP, FTP with PGP, and HTTPS as file transfer methods. For security, a target bank may support FTP transmissions, but will require using PGP encrypted payloads. In this scenario, the present invention encrypts the data prior to transmission with PGP and then uses "normal" FTP (RFC959) to transmit it. Conversely, the present invention can receive data back from the bank, for instance, to confirm that the upload was successful and to get back the print stream for printing. In this case, the present invention receives PGP encrypted data from the bank and decrypts it.

Some banking institutions, for example Wachovia, utilize secure FTP for data transmissions. This method is compliant with RFC2228 specs and uses SSL with 128 bit cipher strength to create the encrypted sockets used to protect both the command and data channels.

In another embodiment, the present invention utilizes HTTPS (Browser-based) file transmissions. The present invention, or a user using the present invention, logs on to a secure web page and sends/receives data.

VIII. Generating Target Document

Figure 13:
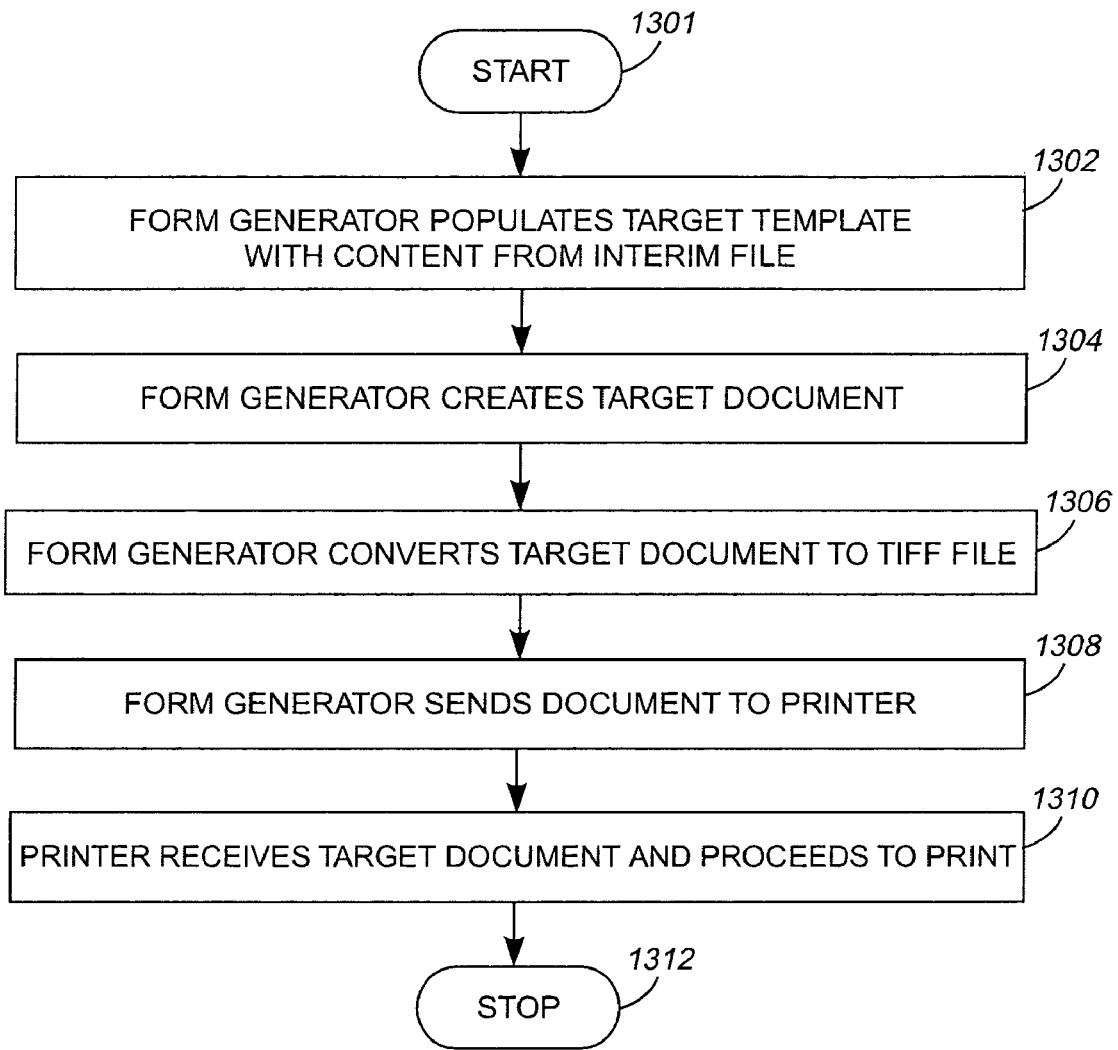
FIG. 13 is a flowchart illustrating substeps with step 214 of FIG. 2 according to the present invention.

FIG. 13 is a flowchart depicting the operation and control flow of the target document generation process of one embodiment of the present invention. FIG. 13 provides additional detail of the process represented by step 214 of FIG. 2. The control flow of FIG. 13 begins with step 1301 and flows directly to step 1302. In step 1302, the form generator 916 of mapper 106 populates the target zones of target template 918 using the content in interim file 914, as specified by the target template 918. In an embodiment of the present invention, in step 1302, the form generator 916 also populates the target document with static content information specified by the user in an optional step after step 206 of FIG. 2. After the target template is populated with all necessary content from the interim file, the flow of FIG. 13 moves to step 1304. In step 1304, the form generator 916 generates the target document.

In step 1306, the form generator 916 converts the target document to a TIFF file 920. In an embodiment of the present invention, in step 1306, form generator 916 may also convert the target document into a printer format that is supported by printer 922. For example, the original print stream 904 may have been directed towards a particular type of printer, such as a non-impact printer, a laser printer, an inkjet printer, a bubblejet printer, a dot matrix printer, a thermal printer, or the like. In this case, the form generator 916 converts the target document into a printer format that is supported by printer 922. In step 1308, the form generator 916 sends the TIFF file 920 to the printer 922 for printing. In step 1310, the printer 922 receives the TIFF file 920 and proceeds to print the file. In step 1312, the control flow of FIG. 13 ceases.

IX. File Format Conversion

In an embodiment of the present invention, mapper 106 performs file format conversion between applications and/or operating systems having incompatible file format. In this embodiment, the mapper 106 captures a print stream containing a source document that was sent to a printer by a first application executing in a first operating system (OS). Subsequently, the mapper 106 proceeds to generate a target document in a file format that is supported by a second application executing in a second operating system. This is described in greater detail below.

This process is advantageous as it provides for increased compatibility between different applications and OS's. Unlike the previous embodiments, the output destination here is an application or OS. As an example of a situation wherein the aforementioned process is advantageous, consider a small business that utilizes a PC-based small business financial software application such as Quickbooks. As the small business grows into a middle sized business, the firm decides to utilize a Unix-based financial software application. As a result, the firm is faced with the problem of porting all of its current PC-based Quickbooks files and databases to a Unix-based software application. Using the proposed invention, the business sends the PC-based QuickBooks files in a print stream to a converter module. The converter module then converts the information in the print stream into a format that is compatible with the Unix-based software application.

Figure 14:
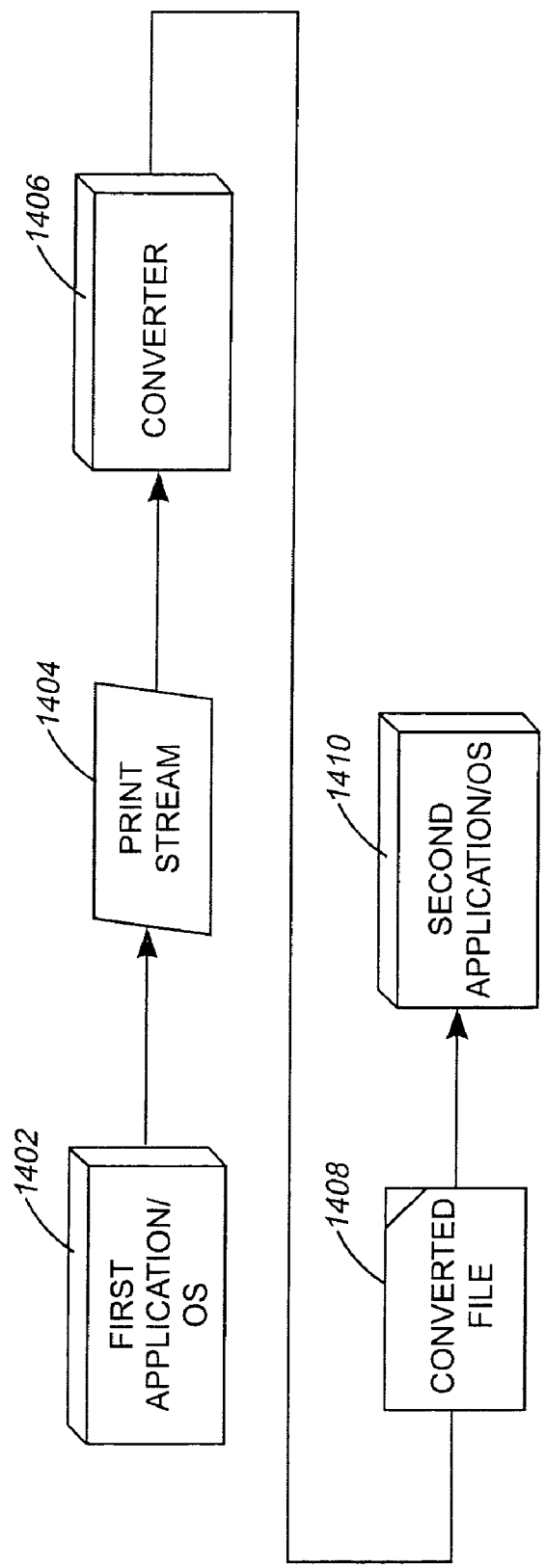
FIG. 14 is a functional diagram illustrating the file conversion process of another embodiment of the present invention.

FIG. 14 is a functional diagram illustrating the file conversion process of another embodiment of the present invention. FIG. 14 shows a first application executing in a first OS 1402. In this embodiment, the first application/OS 1402 produces files and/or databases that are not compatible with a second application executing in a second OS 1410. First application/OS 1402 subsequently produces print stream 1404 containing a source document. Then, print stream 1404 is received by converter 1406, representing a module of mapper 106. Converter 1406 proceeds to convert print stream 1404 into a converted file 1408, which conforms to a format supported by second application/OS 1410. The manner in which converter 1406 converts the print stream 1404 is described in greater detail below. Subsequently, second application/OS 1410 receives the converted file 1408.

In an embodiment of the present invention, the first application is not compatible with the second application and the first OS is not compatible with the second OS. In this case, the converter 1406 must convert between incompatible applications and operating systems. In another embodiment of the present invention, the first application is identical to the second application and the first OS is not compatible with the second OS. In this case, the converter 1406 must convert only between incompatible operating systems. In yet another embodiment of the present invention, the first application is not compatible with the second application and the first OS is identical to the second OS. In this case, the converter 1406 must convert only between incompatible applications.

In another embodiment of the present invention, the conversion process executed by converter 1406 also includes the conversion of a print stream into a format compatible with a particular type of printer. This embodiment is advantageous in situations where the first application/OS 1402 does not support a particular type of printer, such as an impact printer. Using the proposed invention, the print stream 1404 is converted into a format that is compatible with impact printers and provided to second application/Os 1410 for printing.

In yet another embodiment of the present invention, the converter 1406 is a separate software application that is available to user 102 for converting files. In this embodiment, upon the recognition that the documents produced by a first application/OS 1402 are not compatible with a second application/OS 1410, a user 102 accesses the converter 1406 and executes converter 1406 to convert the incompatible files at issue. In one alternative, the converter 1406 is available to user 102 on removable storage medium such as a CD or a floppy disk. In another alternative, the converter 1406 is available to user 102 for download from a web page or web site.

Figure 15:
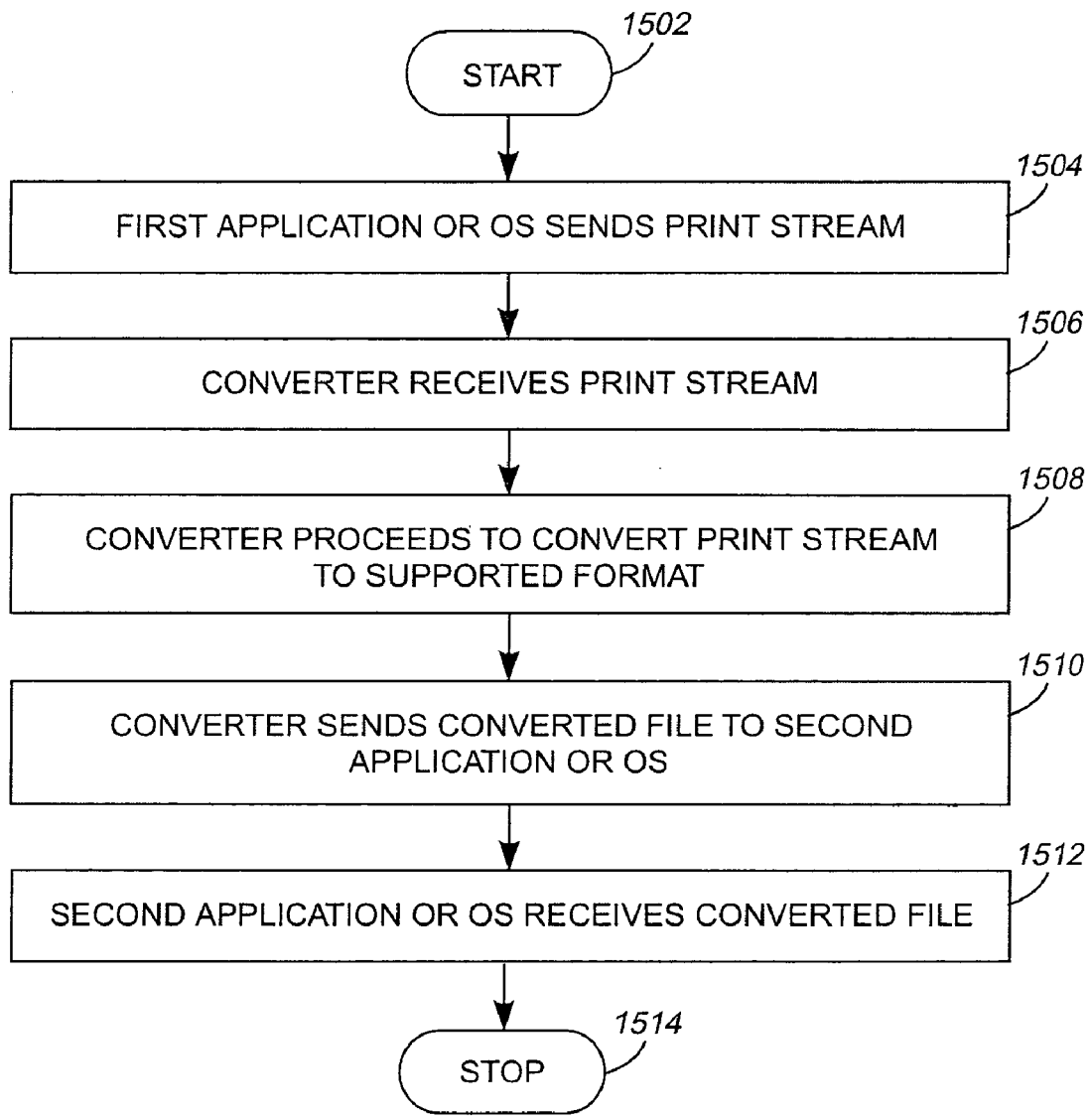
FIG. 15 is a flowchart depicting the operation and control flow of the file conversion process of FIG. 11 according to the present invention.

FIG. 15 is a flowchart depicting the operation and control flow of the file conversion process of FIG. 14 according to the present invention. FIG. 15 provides additional detail of the process represented by functional module 1406 of FIG. 14. The control flow of FIG. 15 begins with step 1502 and flows directly to step 1504. In step 1504, first application/OS 1402 produces a print stream 1404 containing a source document. In step 1506, converter 1406 receives the print stream 1404. In step 1508, converter 1406 converts the print stream 1404 into a format supported by second application or OS 1410.

In one embodiment of the present invention, converter 1406 accomplishes the task of step 1508 using a process similar to the process defined in FIG. 2 above. That is, for each type of source document, a template is generated which defines the content in the source document, and for each target document, a template is generated which defines the source of the content in the target document. Subsequently, the target document is generated upon the provision of a source document via a print stream. In another embodiment of the present invention, the converter 1406 accomplishes the task of step 1508 by modifying file header information or other file metadata information of the document extracted from print stream 1404 in order to generate a file that is compatible and readable by the second application/OS 1410. In step 1510, converter 1406 sends the converted file 1408 to the second application/OS 1410. In step 1512, the second application/OS 1410 receives the converted file 1408. In step 1514, the control flow of FIG. 15 ceases.

X. PC Postage

In an embodiment of the present invention, the proposed invention can modify PC postage printed onto a business form or mailer, while adhering to security measures protecting PC postage from tampering. In this embodiment, the form generator 916 of the mapper 106 receives the PC postage for insertion into the target document. The form generator 916 receives the PC postage either from the source document in step 210 of FIG. 2 or directly from PC postage software provided by a PC postage provider during the target document generation step 214. Examples of current PC postage providers are Pitney-Bowes, Endicia, Stamps.com and Neopost. In the case where the PC postage is received directly from PC postage software, the user 102 is given the option of selecting the PC postage provider. Once the PC postage is received, the form generator 916 can proceed to reposition or rotate the PC postage during the target document generation step 214. In doing so, the security measures protecting the PC postage are followed. Furthermore, the postal regulations defining the proper placement of the PC postage are complied with. This allows the user 102 more flexibility in positioning the PC postage onto the business form or mailer.

XI. Printing in a Secure Environment

Figure 16:
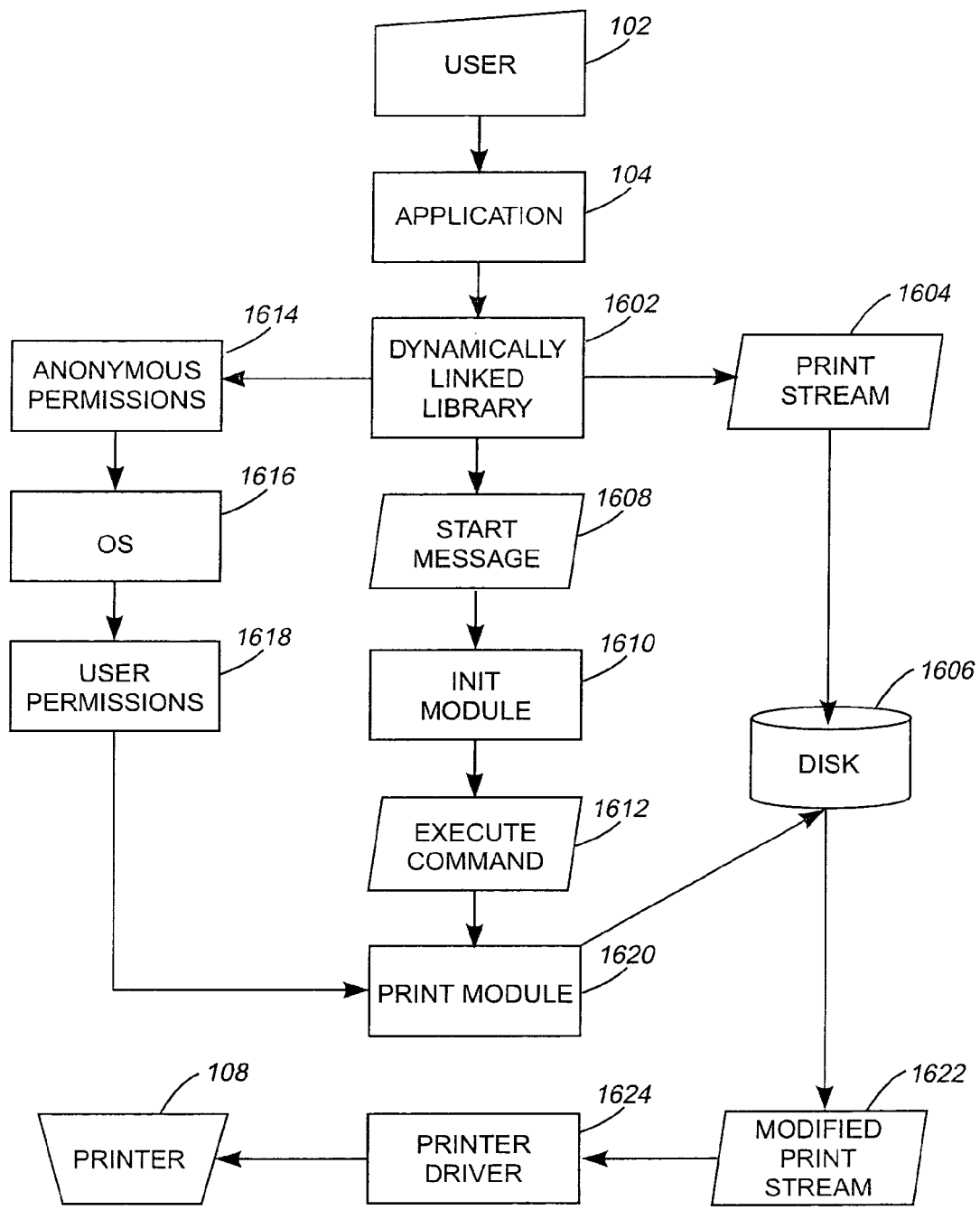
FIG. 16 is a functional diagram illustrating one embodiment of the printing process of the present invention.

FIG. 16 is a functional diagram illustrating one embodiment of the printing process of the present invention. The process illustrated in FIG. 16 begins with the user 102 using the application 104 to issue a print command. The print command is received by the dynamically linked library (DLL) 1602. Upon execution, the DLL 1602 is automatically assigned the permissions 1614 of the anonymous user account. This poses a problem as conflicts can arise between the permissions 1614 of the anonymous user account and the permissions 1618 of the current user account. For example, the current user account may have permission to print on certain printers, whereas the anonymous user account may not have such permission. Thus, it would be advantageous for the process of the present invention to adhere to the permissions of the current user account.

The DLL 1602 subsequently proceeds to produce a print data stream 1404 that is saved onto a floppy or a hard disk 1606. Next, the DLL 1602 sends a start message 1608 to the initiation module 1610. The initiation module 1610 receives the start message 1608 and proceeds to execute. Because the initiation module 1610 is spawned or executed by a DLL, it is automatically assigned the permissions 1618 of the current user account from the operating system 1616. Next, the initiation module 1610 issues an execute command 1612 to the print module 1620. In addition, the initiation module 1610 sends the permissions 1618 of the current user account to the print module 1620. The print module 1620 receives the execute command 1612 and the permissions 1618 and proceeds to execute. This solves the problem posed above, as the print module 1620, which will initiate the print process, adheres to the permissions of the current user account.

Upon execution, the print module 1620 proceeds to retrieve the print data stream 1604 from the disk 1606. Next, the print module 1620 modifies the print data stream 1604 to conform to a template that is specified by the user 102. The process of modifying a print stream to conform to a predefined template is discussed in greater detail above. Subsequently, a modified print data stream 1622 is generated by print module 1620. The modified print data stream 1622 is then sent to printer driver 1624 for printing. It should be noted that upon reception of the modified print data stream 1622 by printer driver 1624, the permissions of the current user account are evaluated. The printer driver 1624 proceeds to initiate printing of the modified print data stream 1622 on the printer 108 in compliance with the permissions of the current user account.

Figure 17:
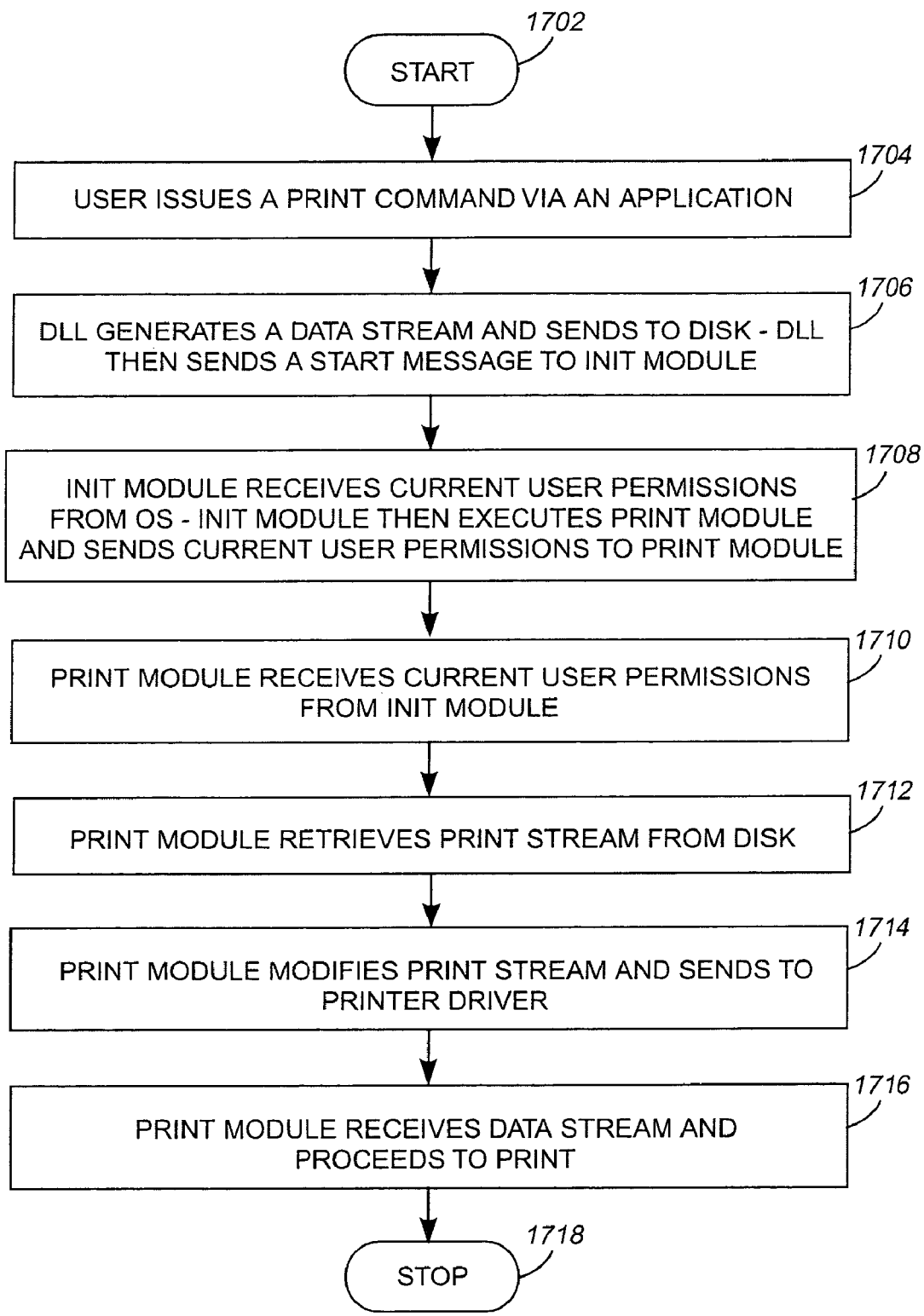
FIG. 17 is a flowchart depicting the operation and control flow of the embodiment of FIG. 14.

FIG. 17 is a flowchart depicting the operation and control flow of the embodiment of FIG. 16. The control flow of FIG. 17 begins with step 1702 and flows directly to step 1704. In step 1704, the user 102 issues a print command via an application 104. In step 1706, the print command is received by a DLL 1602. Upon execution, the DLL 1602 is automatically assigned the permissions 1614 of the anonymous user account. Subsequently, the DLL 1602 generates a print data stream 1604 and sends it to a disk 1606 for storage. Lastly, the DLL 1602 sends a start message 1608 to an initiation module 1610.

In step 1708, the initiation module 1610 executes in response to the start message 1608 and proceeds to receive current user account permissions 1618 from the operating system 1616. Subsequently, the initiation module 1610 issues an execute command 1612 to print module 1620. In addition, the initiation module 1610 sends the permissions 1618 of the current user account to the print module 1620. In step 1710, the print module 1620 executes in response to the execute command 1612 and proceeds to receive current user account permissions 1618 from the initiation module 1610.

In step 1712, the print module 1620 retrieves the print data stream 1604 from the disk 1606. Next, in step 1714, the print module 1620 modifies the print data stream 1604 to conform to a template that is specified by the user 102. Subsequently, a modified print data stream 1622 is generated by print module 1620 and sent to printer driver 1624 for printing. In step 1716, the printer driver 1624 proceeds to initiate printing of the modified print data stream 1622 on the printer 108 in compliance with the permissions of the current user account. In step 1718, the control flow of FIG. 17 ceases.

Figure 18:
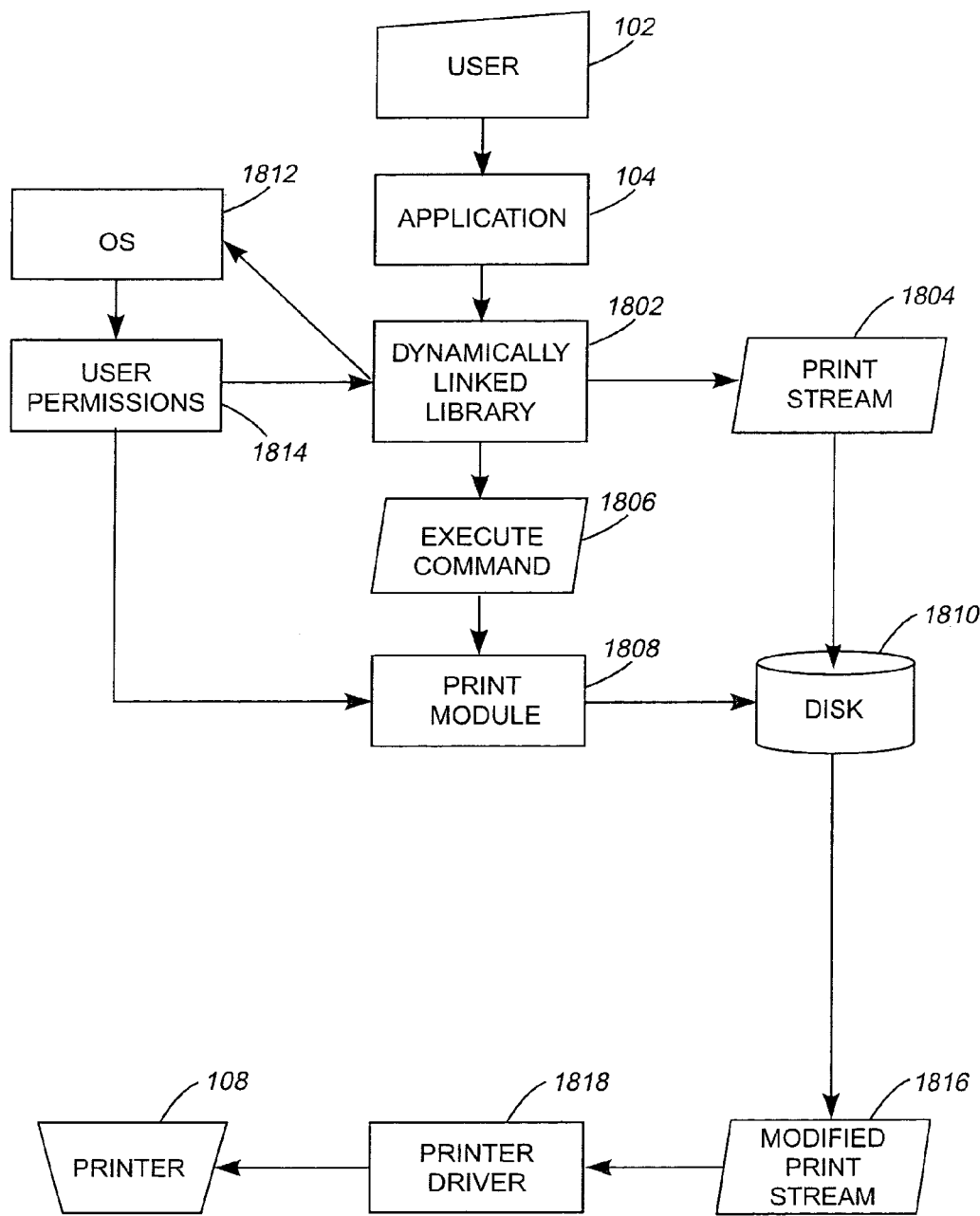
FIG. 18 is a functional diagram illustrating another embodiment of the printing process of the present invention.

FIG. 18 is a functional diagram illustrating another embodiment of the printing process of the present invention. The process illustrated in FIG. 18 begins with the user 102 using the application 104 to issue a print command. The print command is received by the DLL 1802.

Next, the DLL 1802 acquires access to the permissions 1814 of the current user account. The DLL 1802 can accomplish this task in a variety of ways. In one embodiment, the DLL 1802 prompts the user 102 to enter his authentication information (such as login and password), which is then used to acquire the permissions 1814 of the current user. In another embodiment, the DLL 1802 can read the operating system files associated with user accounts and determine the authentication information for the current user. The authentication information is then used to acquire the permissions 1814 of the current user account. In yet another embodiment, the DLL 1802 presents to the operating system 1812 a pointer to the permissions 1814 of the current user account. These permissions are then attributed to the user 102 by the operating system 1812. This feature solves the problem posed above, as the DLL 1802 adheres to the permissions of the current user account.

The DLL 1802 then proceeds to produce a print data stream 1804 that is subsequently saved onto a floppy or a hard disk 1810. Subsequently, the DLL 1802 sends an execute command 1806 to the print module 1808, as well as the permissions 1814 of the current user account. The print module 1808 receives the execute command 1806 and permissions 1814 and thus proceeds to execute.

Upon execution, the print module 1808 proceeds to retrieve the print data stream 1804 from the disk 1810. Next, the print module 1808 modifies the print data stream 1804 to conform to a template that is specified by the user 102. Subsequently, a modified print data stream 1816 is generated by print module 1608. The modified print data stream 1816 is then sent to printer driver 1818 for printing. It should be noted that upon reception of the modified print data stream 1816 by printer driver 1818, the permissions 1814 of the current user account are evaluated. The printer driver 1818 proceeds to initiate printing of the modified print data stream 1816 on the printer 108 in compliance with the permissions 1814 of the current user account.

Figure 19:
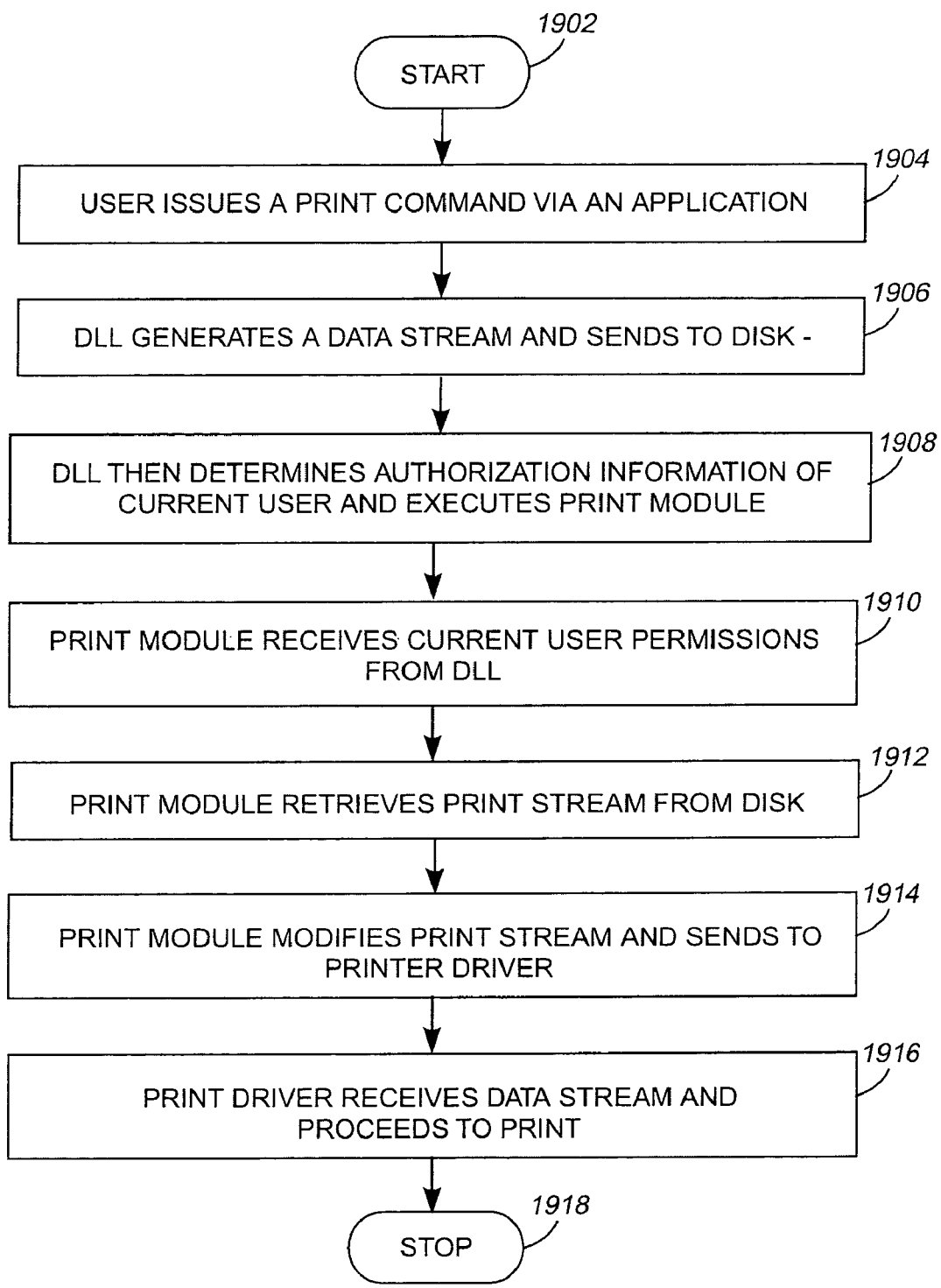
FIG. 19 is a flowchart depicting the operation and control flow of the embodiment of FIG. 16.

FIG. 19 is a flowchart depicting the operation and control flow of the embodiment of FIG. 18. The control flow of FIG. 19 begins with step 1902 and flows directly to step 1904. In step 1904, the user 102 issues a print command via an application 104. In step 1906, the DLL 1802 generates a print data stream 1804 and sends it to a disk 1810 for storage. In step 1908, the DLL 1802 determines the authentication information of the current user and acquires the permissions 1814 of the current user account. This is described in greater detail above. Also, the DLL 1802 sends an execute command 1806 to the print module 1808.

In step 1910, the print module 1808 executes in response to the execute command 1806 and proceeds to receive current user permissions 1814 from the DLL 1802. In step 1912, the print module 1808 retrieves the print data stream 1804 from the disk 1810. Next, in step 1914, the print module 1808 modifies the print data stream 1804 to conform to a template that is specified by the user 102. Subsequently, a modified print data stream 1816 is generated by print module 1808 and sent to printer driver 1818 for printing. In step 1916, the printer driver 1818 proceeds to initiate printing of the modified print data stream 1816 on the printer 108 in compliance with the permissions 1814 of the current user account. In step 1918, the control flow of FIG. 19 ceases.

XII. Content Protection in a Multi-User Computer System

Figure 20:
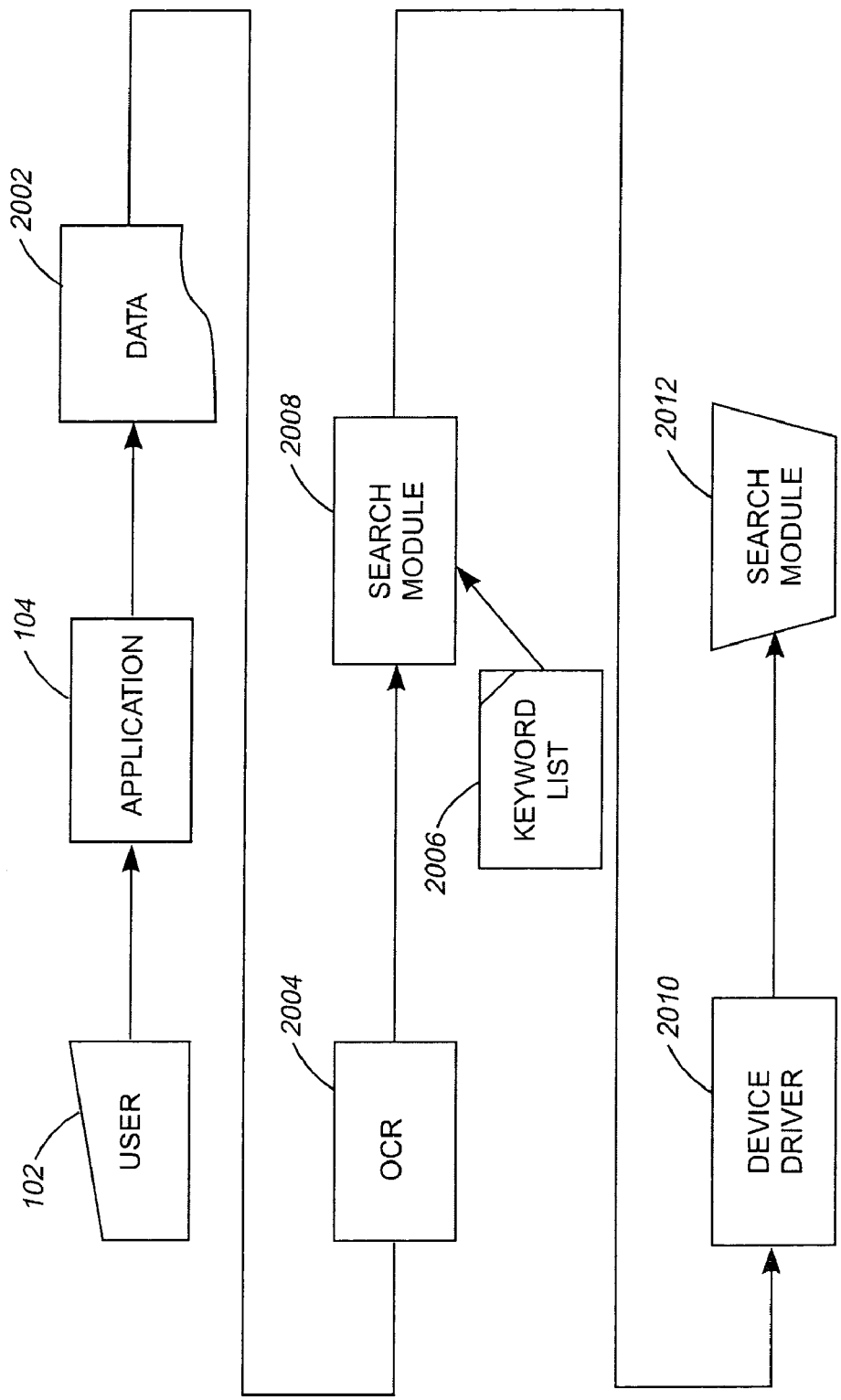
FIG. 20 is a functional diagram illustrating the content protection process of one embodiment of the present invention.

FIG. 20 is a functional diagram illustrating the content protection process of one embodiment of the present invention. The content protection process of FIG. 20 begins with the user 102 utilizing application 104 to send data 2002 to a device 2012 via a device driver 2010. The data 2002 is any file containing data, such as a document, a text file, an audio file and a video file. The device 2012 is any computer data storage or output device. For example, device 2012 can be a hard drive, a floppy drive, removable storage media, a printer, an audio speaker, a network location or an Internet location. The process of FIG. 20 is performed when an attempt or a request is made to send data 2002 to any such device 2012.

Upon reception of the request, an optical character recognition (OCR) module 2004 receives the data 2002 and proceeds to generate a text representation of the information in data 2002 using OCR techniques. OCR techniques are commonly known to one of ordinary skill in the art. It should be noted that the OCR step is only executed if the data 2002 is in a binary form that can be processed by OCR. A PostScript file format or a TIFF file format are examples of formats that can be processed by OCR. If the data 2002 were, for example, text data, then the OCR process would be unnecessary and the search process of search module 2008 would be initiated.

Next, the text representation of data 2002 is provided to search module 2008. Search module 2008 then reads in a keyword list 2006. The keyword list 2006 comprises a list of text words that are typically associated with documents or files that should be kept confidential or secret. An example of a keyword list is shown below:
    confidential
    secret
    trade secret
    privileged Subsequently, the search module 2008 searches the text representation of data 2002 for the keywords in the keyword list 2006. If the search module 2008 finds any of the keywords in keyword list 2006 in the text representation of data 2002, then the user 102 is denied access to the device 2012. In one alternative, the user 102 is prompted to enter authentication information in order to gain access to the device 2012. If the entered information is deemed to be authentic, then the user 102 is granted access to the device 2012.

If the search module 2008 does not find any of the keywords in keyword list 2006 in the text representation of data 2002, then the user 102 is granted access to the device 2012. Consequently, the data 2002 is sent to device driver 2010, which proceeds to process the data 2002 on the device 2012.

Figure 21:
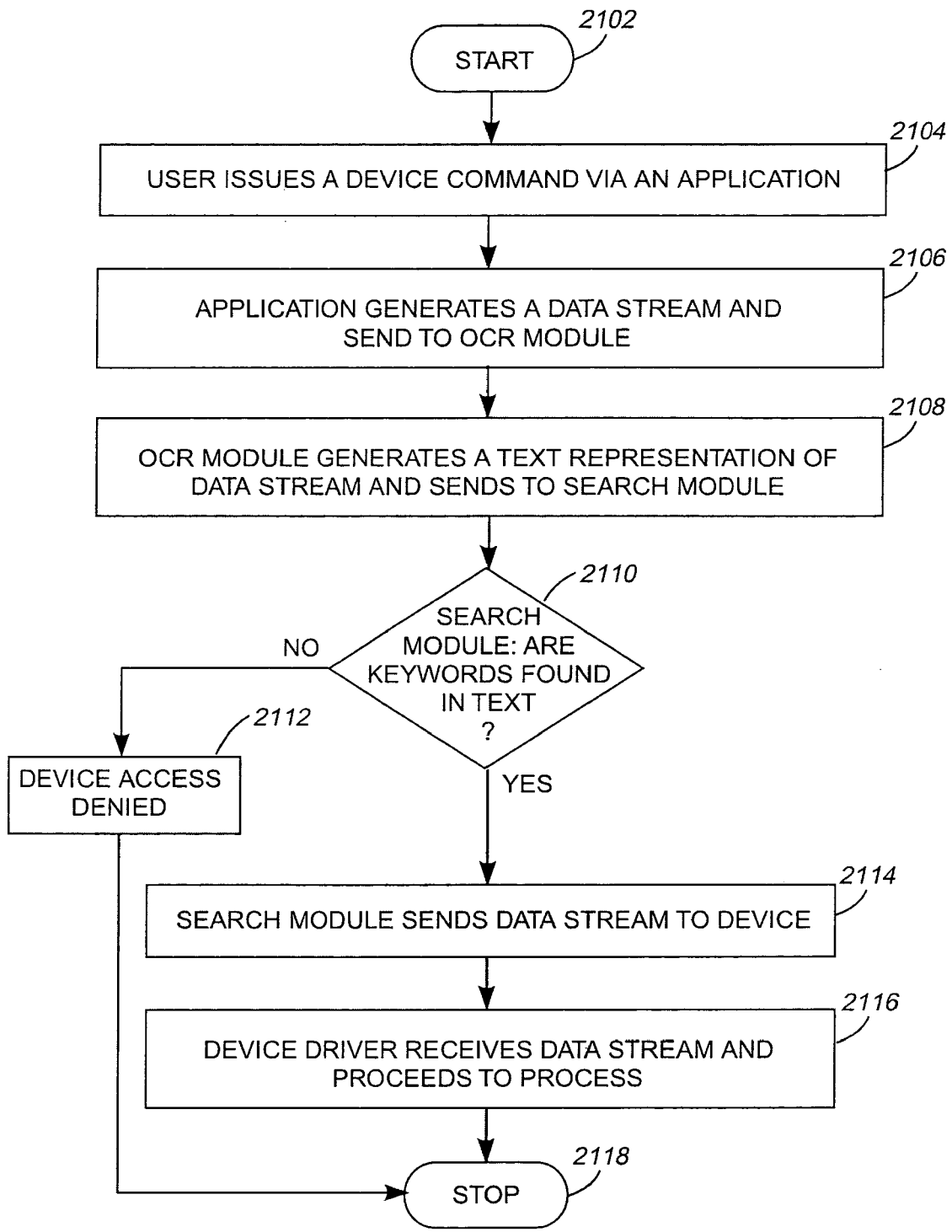
FIG. 21 is a flowchart depicting the operation and control flow of the embodiment of FIG. 18.

FIG. 21 is a flowchart depicting the operation and control flow of the embodiment of FIG. 20. The control flow of FIG. 21 begins with step 2102 and flows directly to step 2104. In step 2104, a user 102 issues, via an application 104, a data process command to a device 2012. The data process command involves the use of data 2002. A data process command is any command issued to a device that involves the processing of data. Examples of a data process command includes, a command for storing data on a hard disk, a command for printing data on a printer and a command for playing audio data on an audio speaker.

In step 2106, the application 104 generates data 2002, which is received by the OCR module 2004. In step 2108, the OCR module 2004 generates a text representation of the information in data 2002 using OCR techniques. Next, the text representation of data 2002 is provided to search module 2008. As explained above, if the data 2002 is not in a format that can be processed by OCR, then the OCR step 2108 would not be executed and no text representation of data 2002 would be generated for search module 2008. If, however, the data 2002 were already in a text format, then the data 2002 would be immediately provided to search module 2008 and the OCR step 2108 would be bypassed altogether. In this case, control would flow from step 2106 directly to step 2010.

In step 2110, the search module 2008 searches the text representation of data 2002 for the keywords in the keyword list 2006. If the search module 2008 finds any of the keywords in keyword list 2006 in the text representation of data 2002, then the user 102 is denied access to the device 2012 in step 2112. Optionally, in step 2112, the user 102 is prompted to enter authentication information in order to gain access to the device 2012 in steps 2114-2116. If the entered information is deemed to be authentic, then the user 102 is granted access to the device 2012. If the search module 2008 does not find any of the keywords in keyword list 2006 in the text representation of data 2002, then the user 102 is granted access to the device 2012 in steps 2114-2116.

In step 2114, the data 2002 is sent to device driver 2010. In step 2116, device driver 2010 proceeds to process the data 2002 on the device 2012. In step 2118, the control flow of FIG. 21 ceases.

XIII. Data Capture During the Print Process

Figure 22A:
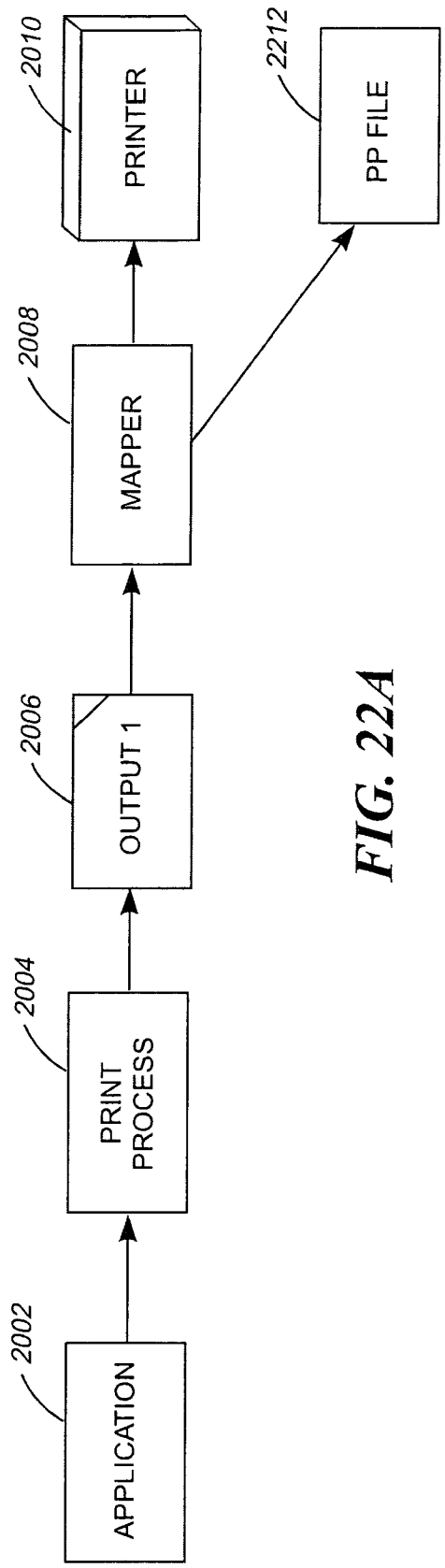
FIG. 22A is a block diagram illustrating a printing system architecture according to one embodiment of the present invention.

FIG. 22A is a block diagram illustrating a printing system architecture according to one embodiment of the present invention. The FIG. 22A shows a printing system architecture as used by the embodiments of the present invention depicted in Section VI The Mapper (see FIG. 9) and Section XI Printing in a Secure Environment (see FIG. 16). FIG. 22A shows an application 2202, which is a word processor, a financial management suite, or the like. The application 2202 commences a print process 2204, which ultimately produces an output 2206—a print data stream. The intermediate processes performed by print process 2204 are inconsequential as only the print data stream, output 2206, is necessary. Next, the mapper 2208 reads and processes the print data stream, output 2206, to conform to a predetermined template, as described in greater detail above. Then, the processed print data stream is sent to printer 2210 for printing and to a Positive Pay file 2212 for storage. In this way, the present invention is a one-button process that both prints a check and makes a Positive Pay entry with the click of a single button.

Figure 22B:
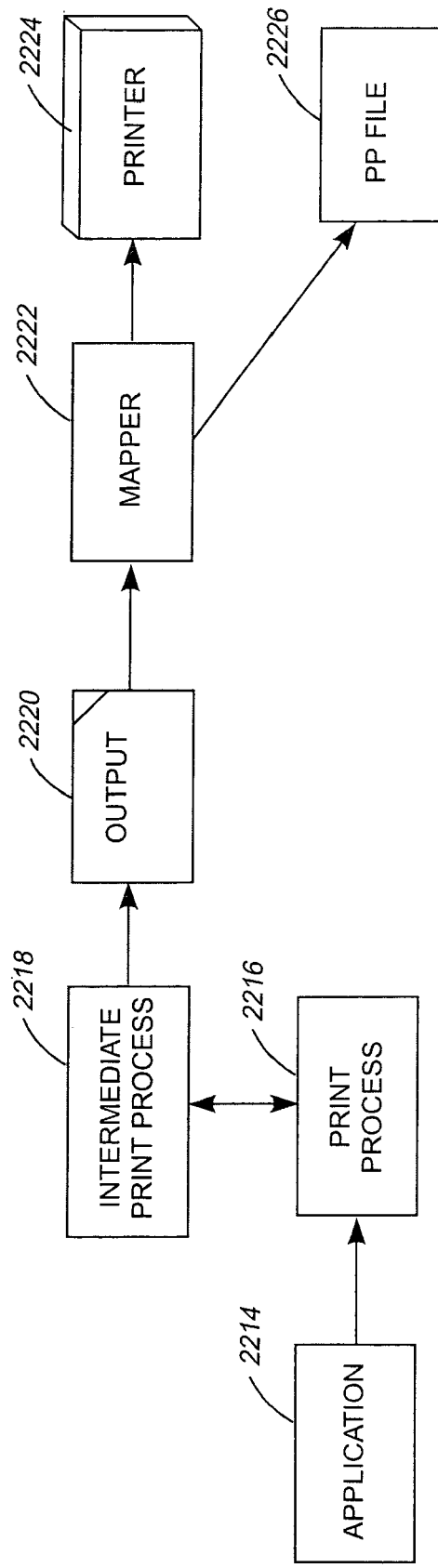
FIG. 22B is a block diagram illustrating a printing system architecture according to another embodiment of the present invention.

FIG. 22B is a block diagram illustrating a printing system architecture according to another embodiment of the present invention. FIG. 22B shows an application 2214, which is a word processor, a financial management suite, or the like. The application 2212 commences a print process 2216. The data capture portion of the present embodiment becomes involved in the print process 2216 before a print data stream is created by the print process 2216. This is described in greater detail below. Intermediate print process 2218 communicates with the print process 2216 before a print data stream is created by the print process 2016. Intermediate print process 2218 then produces an output file 2220. Next, the mapper 2022 reads and processes the output file 2220, to conform to a predetermined template, as described in greater detail above. Then, the processed output file 2220 is sent to printer 2224 for printing and to Positive Pay file 2226 for storage.

Figure 23:
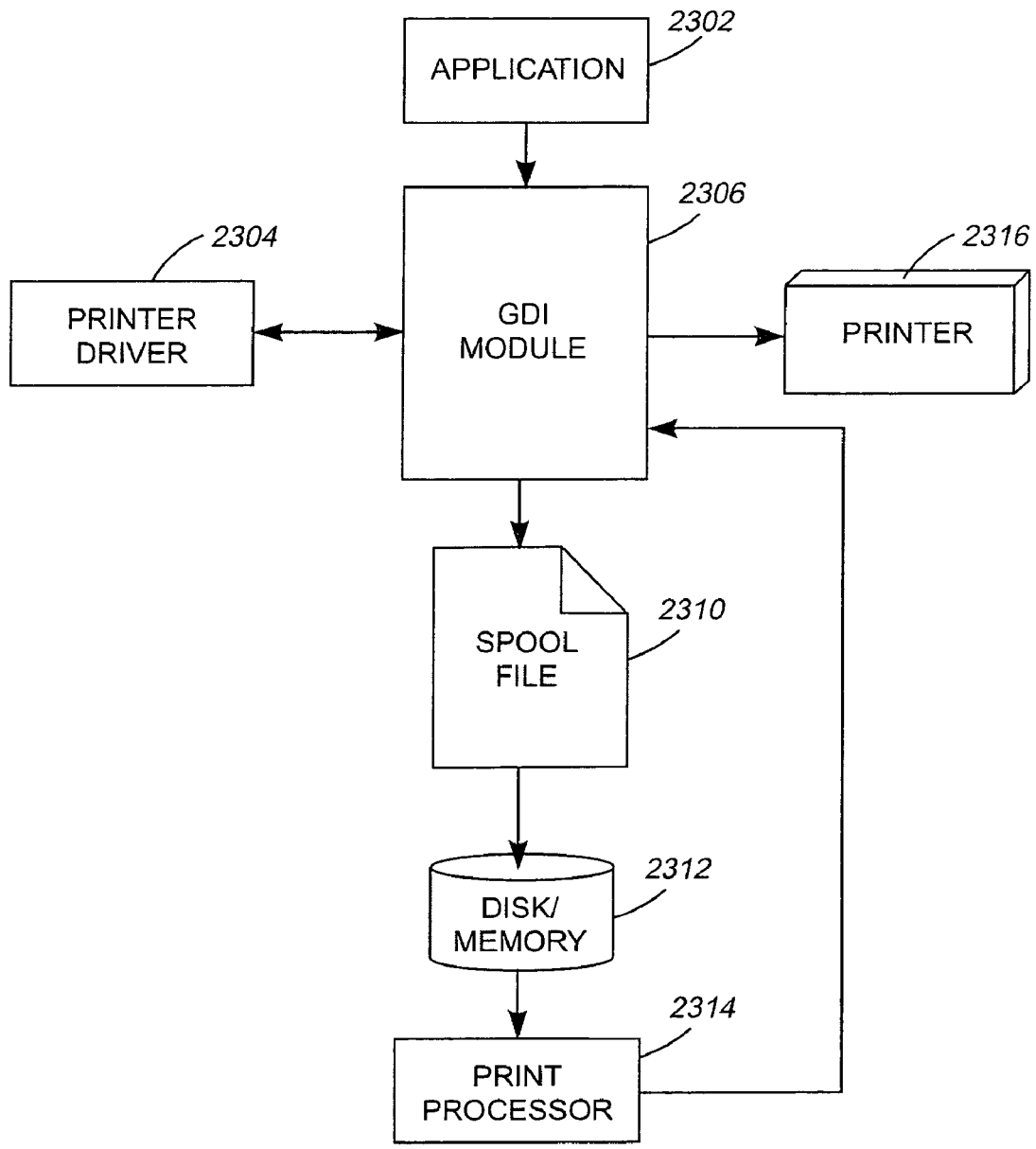
FIG. 23 is a block diagram illustrating a conventional printing process.

FIG. 23 is a block diagram illustrating a conventional printing process. FIG. 23 shows an application 2302 (corresponding to application 104 of FIG. 1) that issues a print request pertaining to a document. The print process begins with the application 2302 creating a device context and writing the objects of the document (images, text, etc.) to the device context. Next, the application 2302 calls the Graphical Display Interface (GDI) module 2306 with the print request for a particular printer (printer 2316, corresponding to printer 108 of FIG. 1) using the device context. The GDI module 2306 then calls the printer driver 2304 with a request for instructions on how to render on printer 2316 the objects that were written to the device context. The printer driver 2304 returns instructions to the GDI module 2306 on how to render on printer 2316 the objects that were written to the device context. Next, the GDI module 2306 calls its internal spooler which proceeds to generate a spool file 2310. A spool file is a file holding instructions on how to render certain print objects on a particular printer. A spool file is written in a condensed format.

Next, the spooler writes the spool file 2310 to a disk or memory 2312, which resides on the computer system on which the current print process is executing. Then, a print processor 2314 proceeds to read the spool file 2310 from the disk or memory 2312 and send it to the GDI module 2306. The spool file 2310 is disassembled by the GDI module 2306 and the individual instructions on how to render certain print objects on a particular printer are sent to the printer 2316. The printer 2316 then proceeds to print the document described by the instructions in the spool file 2310.

Figure 24:
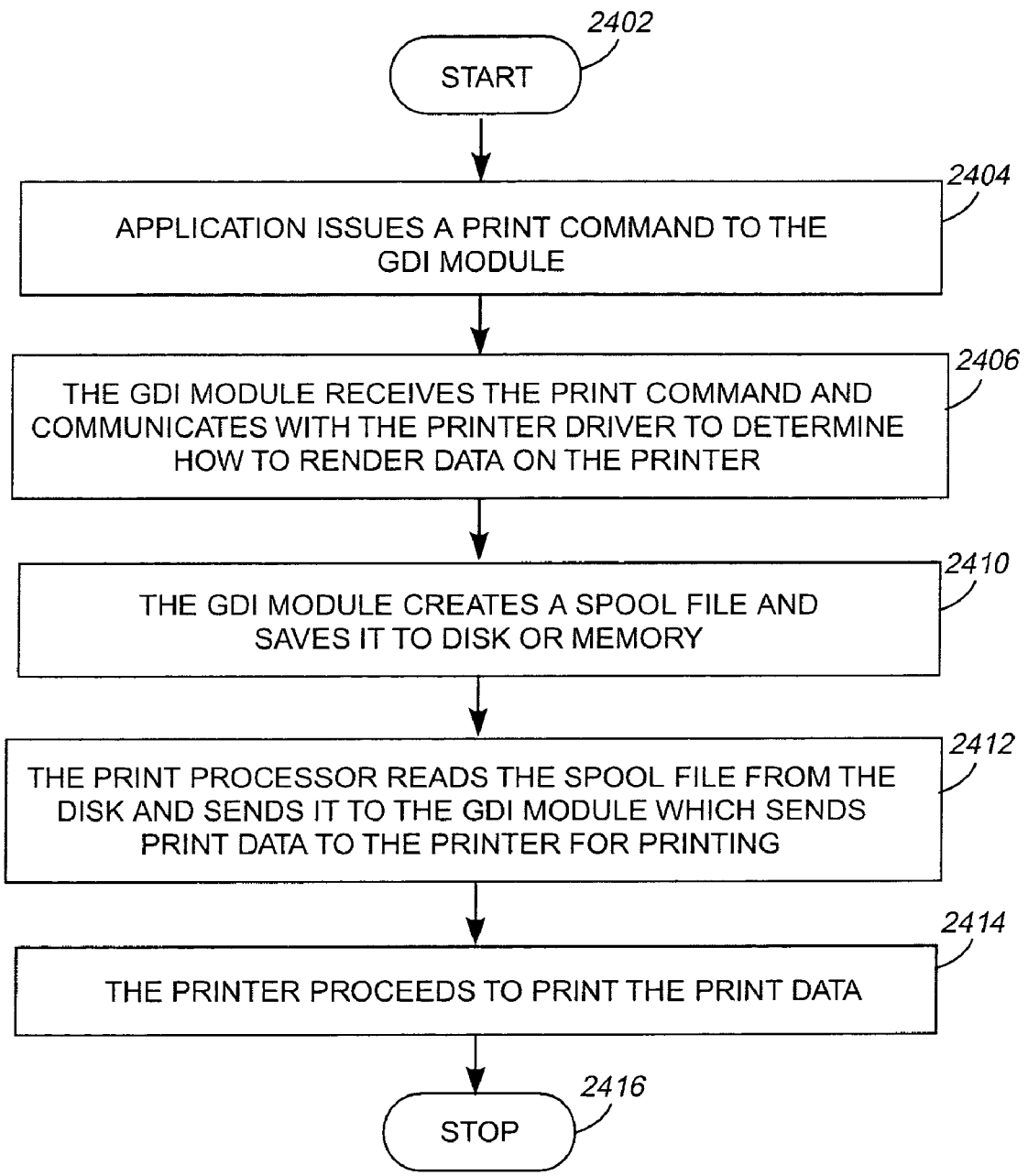
FIG. 24 is a flowchart depicting the operation and control flow of the conventional printing process of FIG. 21.

FIG. 24 is a flowchart depicting the operation and control flow of the conventional printing process of FIG. 23. The control flow of FIG. 24 begins with step 2402 and proceeds directly to step 2404. In step 2404, application 2302 (corresponding to application 104 of FIG. 1) issues a print command to the GDI module 2306 pertaining to a document. Application 2302 creates a device context and writes the objects of the document (images, text, etc.) to the device context. Application 2302 calls the GDI module 2306 with the print command for a particular printer (printer 2316, corresponding to printer 108 of FIG. 1) using the device context. In step 2406, GDI module 2306 receives the print command then calls the printer driver 2304 with a request for instructions on how to render on printer 2316 the objects that were written to the device context. The printer driver 2304 returns instructions to the GDI module 2306 on how to render on printer 2316 the objects that were written to the device context.

In step 2410, the GDI module 2306 proceeds to generate a spool file 2310 written in a condensed format. Next, the spooler writes the spool file 2310 to a disk or memory 2312, which resides on the computer system on which the current print process is executing. In step 2412, a print processor 2314 proceeds to read the spool file 2310 from the disk or memory 2312 and send it to GDI module 2306. The spool file 2310 is disassembled by the GDI module 2306 and the individual instructions on how to render certain print objects on a particular printer are sent to the printer 2316. In step 2414, the printer 2316 then proceeds to print the document described by the instructions in the spool file 2310. In step 2416, the control flow of FIG. 24 ceases.

Figure 25:
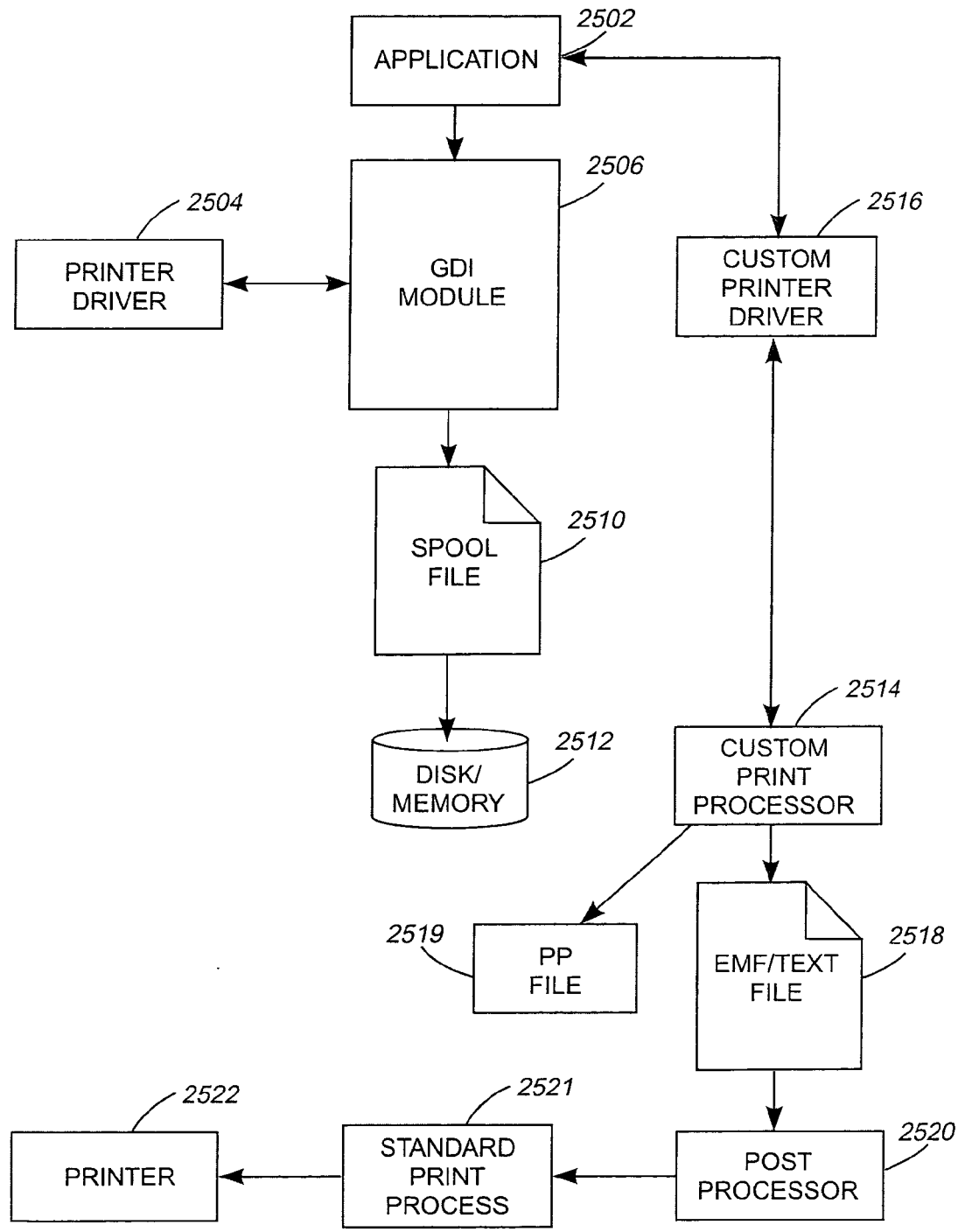
FIG. 25 is a block diagram illustrating the printing process according to one embodiment of the present invention.

FIG. 25 is a block diagram illustrating the printing process according to one embodiment of the present invention. FIG. 25 shows an application 2502 (corresponding to application 104 of FIG. 1) that issues a print request pertaining to a document. The print process begins with the application 2502 creating a device context and writing the objects of the document (images, text, etc.) to the device context. Next, the application 2502 calls the GDI module 2506 with the print request for a particular printer (printer 2522, corresponding to printer 108 of FIG. 1) using the device context. The GDI module 2506 then calls the printer driver 2504 with a request for instructions on how to render on printer 2522 the objects that were written to the device context. The printer driver 2504 returns instructions to the GDI module 2506 on how to render on printer 2522 the objects that were written to the device context. Next, the GDI module 2506 calls its internal spooler which proceeds to generate a spool file 2510 written in a condensed format, such as in EMF.

Next, the spooler writes the spool file 2510 to a disk or memory 2512, which resides on the computer system on which the current print process is executing. Then, a custom print processor 2514 proceeds to read the spool file 2510 from the disk or memory 2512. The custom print processor 2514 is a process implemented in software, hardware, or a combination of both. The custom print processor 2514 communicates with the custom printer driver 2516.

The custom printer driver 2516 operates as a front end to the custom print processor 2514. The custom printer driver 2516 holds user customizable settings and instructions that are processed by the custom print processor 2514 during print processing. For example, the custom printer driver 2516 holds information regarding where (a directory path) the custom print processor 2514 writes output files. The custom printer driver 2516 also holds information regarding the format—text or EMF or both—of the custom print processor 2514 output files. The custom printer driver 2516 also holds instructions regarding when the custom print processor 2514 generates output files of a particular format. An example of such instructions are: if the destination template does not require extraction of images from the source document, then generate an output file in text format; if the destination template requires extraction of images from the source document, then generate an output file in EMF format.

FIG. 25 also shows a connection between the custom printer driver 2516 and the application 2502. This connection illustrates an interface in the application 2502 that allows the user of the system of the present invention to input user customizable settings for the custom print processor 2514 via the custom printer driver 2516. In an example, the user is provided with a dialog box via the application 2502 for inputting such settings as: location of output file, format of output file and instructions on when to use certain output file formats.

Returning to the custom print processor 2514, the custom print processor 2514 disassembles the spool file 2510 and the individual instructions on how to render certain print objects on a particular printer are read. Then, the custom print processor 2514 produces an output file 2518 containing the information in the spool file 2510. The format of the output file 2518 is dependant on the user customizable settings that are specified at the custom printer driver 2516, as described in greater detail above. A separate output file 2519 is also created. Output file 2519 contains Positive Pay information is stored in a user-defined format or may be defined by bank-specific file format requirements. In one example, if the destination template requires only text information, then an output file 2518 is generated in text format; if the destination template requires image information, then an output file 2518 in EMF format is generated.

Next, the output file 2518 is sent to the post processor 2520. The post processor 2520 encompasses any of the pre-printing processes of the present invention, as described in greater detail above. In one embodiment of the present invention, post processor 2520 encompasses the processes performed by the mapper 106, as described in step 214 of FIG. 2. In another embodiment of the present invention, post processor 2520 encompasses the processes performed by the converter 1406 of FIG. 14. In another embodiment of the present invention, post processor 2520 encompasses the processes performed by the search module 2008 of FIG. 20. In another embodiment of the present invention, post processor 2520 encompasses a process by which the text information in output file 2518 in EMF or text format is translated into a different language.

In the embodiment where the post processor 2520 encompasses the processes performed by the mapper 106, as described in step 214 of FIG. 2, information from the output file 2518 in EMF or text format is garnered using a source template 912 (see FIG. 9). During the process, coordinate information within the output file 2518 in EMF or text format is used. An EMF file contains coordinate information corresponding to text described in the EMF file. The coordinate information provides data as to the location of the corresponding text in the final printed document. The source template 912 includes coordinate information regarding the location of desired text in the source document. Thus, the coordinate information in the output file 2518 is matched with the coordinate information in the source template 912 to garner the desired text from the output file 2518. No additional information, such as a special font used in the output file 2518, is needed for garnering the desired text from the output file 2518.

Subsequent to post processing, the post processor 2520, sends the resulting data to the standard print process 2521. The standard print process 2521 is the conventional print process described in FIG. 23. The standard print process 2521 results in the printing of the data at the printer 2522.

In an embodiment of the present invention, the output files 2518 and 2519 can be distributed over a network via email, FTP, virtual networking or any other mechanism for transferring information over a network. The conventional process for sending a document over a network is to save the document in a word processing format, such as Portable Document Format (PDF). Saving certain data, such as graphics, in PDF format is a lossy procedure. Subsequently, the document is transferred over a network. The recipient then receives the document and prints it out. During printing, the document is converted back to an EMF format. The conventional process described, however, incurs inefficiencies as the document must be converted from EMF to PDF and then back to EMF. Each conversion can be lossy, which results in an overall degradation of information quality over the whole process. In this embodiment, the transferring of a document in EMF format eliminates the information quality degradation problem described above.

In an embodiment of the present invention, the output files 2518 and 2519 can be transferred over a network for printing and/or storage purposes. In this embodiment, a user on a remote network generates output file 2518 and/or output file 2519 in EMF format and transfers the files to another network for printing and/or storage. This is advantageous as an EMF file, as opposed to a PDF file, retains high information quality (no degradation). In another embodiment of the present invention, EMF files transferred over a network for printing are compressed before transmission. This is advantageous as it allows for a reduction in network traffic for remote printing.

The foregoing aspects of the present invention, namely the use of the custom print processor 2514, are advantageous because it is not necessary to return the print data to the GDI module 2506 before further processing. The conventional print process as described in FIG. 23 shows that the print processor 2314 must return the print data to the GDI module 2306 before it is processed and sent to the printer 2316. In the present invention, the custom print processor 2514 processes the print data and then sends it to the post processor 2520 for further processing before it is subsequently printed. Thus, it is not necessary to send the print data back to the GDI module 2306 before it is processed and sent to the printer 2316. This results in a more efficient print process as it reduces the processing requirements and processing time.

In addition, the foregoing aspects of the present invention, namely the use of an EMF or text file 2520, are advantageous because the parsing of an EMF or text file 2520 requires less processing then the use of Optical Character Recognition (OCR) on a print stream. In an embodiment of the present invention, the parser 910, as described in FIG. 9, performs OCR on a print stream in order to extract information for further processing. In another embodiment of the present invention, however, an EMF or text file 2520 is parsed for the desired information, which is then extracted. Thus, the process of parsing of an EMF or text file 2520 for extracting information results in a more efficient system for extracting information.

Figure 26A:
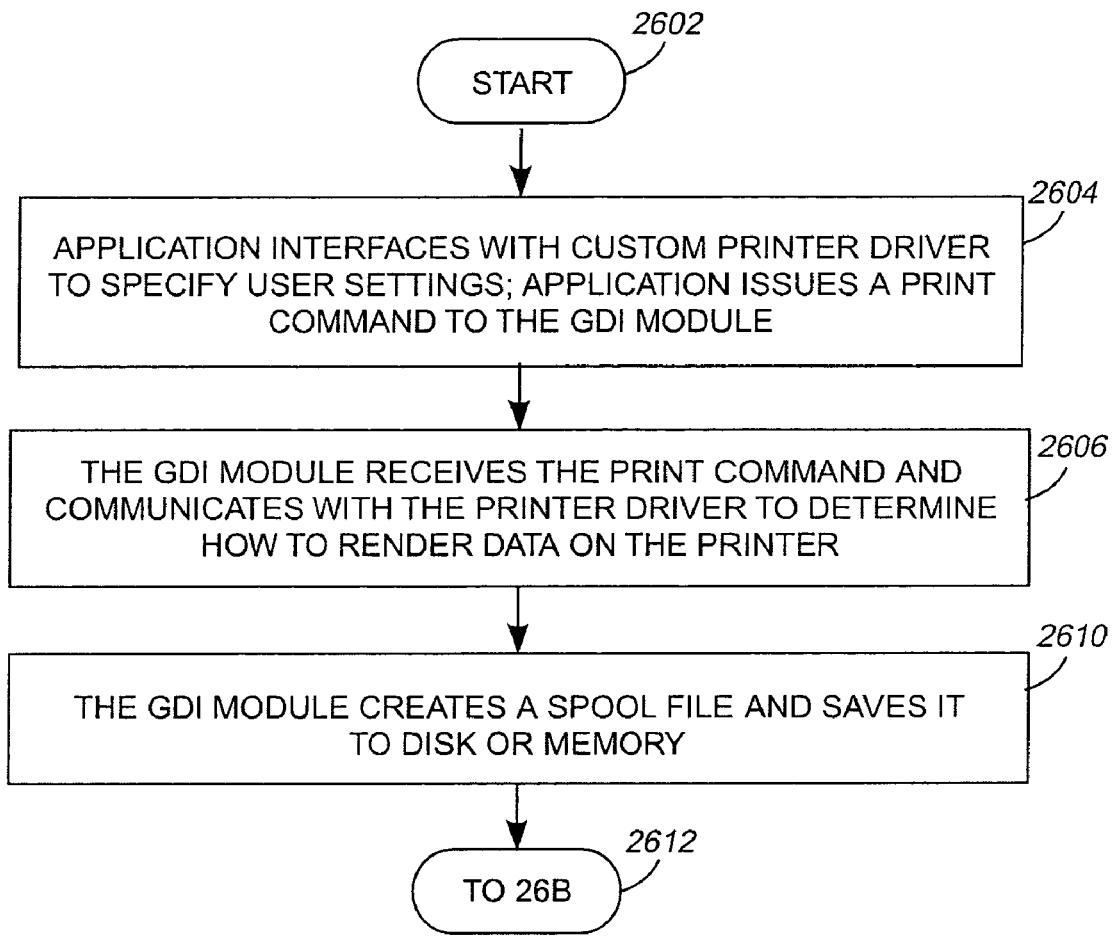
FIG. 26A and FIG. 26B are a flowchart depicting the operation and control flow of the printing process according to the embodiment of FIG. 23.
Figure 26B:
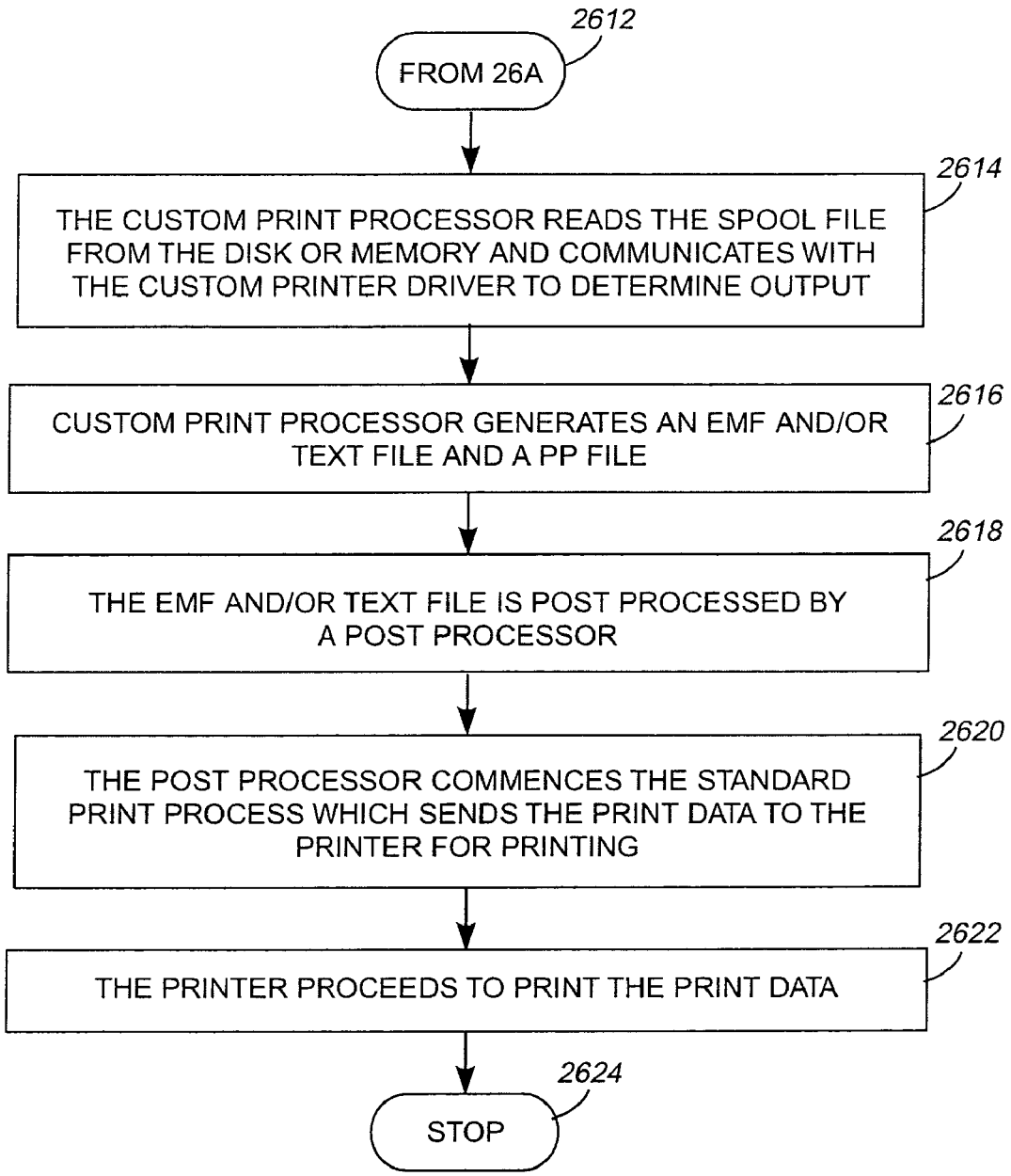

FIG. 26A and FIG. 26B are a flowchart depicting the operation and control flow of the printing process according to the embodiment of FIG. 25. The control flow of FIG. 26A and FIG. 26B begins with step 2602 and proceeds directly to step 2604. In step 2604, application 2502 issues a print command to GDI 2506 pertaining to a document. Application 2502 creates a device context and writes the objects of the document (images, text, etc.) to the device context. Application 2502 calls the GDI 2506 with the print command for a particular printer (printer 2522, corresponding to printer 108 of FIG. 1) using the device context. Also in step 2604, the application 2502 interfaces with the custom printer driver 2516 to read the user specified settings used during print processing. The user specified settings are described in greater detail above.

In step 2606, GDI 2506 receives the print command and calls the custom printer driver 2516 with a request for instructions on how to render on printer 2522 the objects that were written to the device context. The custom printer driver 2516 returns instructions to the GDI 2506 on how to render on printer 2522 the objects that were written to the device context.

In step 2610, the GDI 2506 proceeds to generate a spool file 2510 written in a condensed format. Next, the GDI 2506 writes the spool file 2510 to a disk or memory 2512, which resides on the computer system on which the current print process is executing. Step 2612 of FIG. 26A corresponds to step 2612 of FIG. 26B. The control flow of FIG. 26A proceeds directly to FIG. 26B via step 2612.

In step 2614, a custom print processor 2514 proceeds to read the spool file 2510 from the disk or memory 2512. The custom print processor 2514 also communicates with the custom printer driver 2516 with regards to instructions on how to produce output files. As explained above, the custom printer driver 2516 holds user customizable settings and instructions that are processed by the custom print processor 2514 during print processing.

In step 2616, the custom print processor 2514 disassembles the spool file 2510 and the individual instructions on how to render certain print objects on a particular printer are read. Then, the custom print processor 2514 produces an output file 2518 containing the information in the spool file 2510 and a Positive Pay file 2519 containing bank required information for confirming an issued check. The format of the output file 2518 is dependant on the user customizable settings that are specified at the custom printer driver 2516, as described in greater detail above. In one example, if the destination template requires only text information, then an output file 2518 is generated in text format; if the destination template requires image information, then an output file 2518 in EMF format is generated. The format of the PP file 2519 is dependent on bank requirements.

In step 2618, the output file 2518 is sent to the post processor 2520. As explained above, the post processor 2520 encompasses pre-printing processes of the present invention, such as the mapper 106, the converter 1406 and the search module 2008. In step 2620, subsequent to post processing, the post processor 2520 sends the resulting data to the standard print process 2521. The standard print process 2521 is the conventional print process described in FIG. 23. The standard print process 2521 results in the printing of the data at the printer 2522 in step 2622. In step 2624, the control flow of FIG. 26A and FIG. 26B ceases.

XIV. Pantograph

One of the most common methods of check fraud is alteration of the payee's name. This can be done by changing the letters, removing the letters and replacing them with others, or adding additional names to the payee lines. The present invention provides added security to a printed check that defeats alteration attempts.

In one embodiment of the present invention, a pantograph is added to the payee line. A pantograph is a graphical addition to the payee's name that makes it difficult or impossible for a forger to add a name to or alter the payee's name on the printed check. The pantograph is placed either after the payee name or on top of the payee name and in the adjacent space. Embodiments of the pantograph of the present invention is shown in FIG. 27a-27d, where the pantograph is written over the payee's name and goes negative as it passes through the characters of the payee name.

Figure 27A:
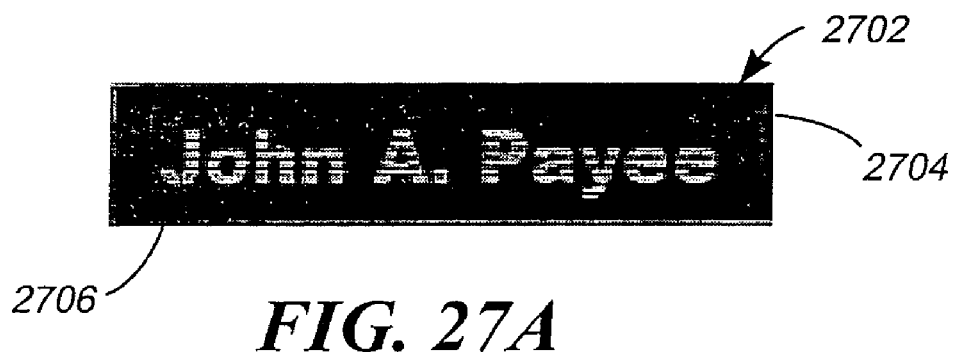
FIG. 27A is a diagram illustrating a pantograph according to one embodiment of the present invention.

FIG. 27a shows a pantograph 2702 that includes a shaded rectangle with horizontal lines 2704 of no color running through. Near the center of the pantograph are characters 2706 forming the payee's name. In this particular embodiment, the characters 2706 are formed as areas of no color in the rectangle. Running through the characters are the horizontal lines 2704, which go negative as they pass through the characters 2706. The result is the ability to read the payee name, without the ability to alter the name. Software instructions can also be given that increases the width of only the portion of the pantograph lines that intersect the payee name characters. The wider pantograph lines help keep the pantograph from filling-in (i.e., making the payee name unreadable), especially on some inkjet printers. Through the use of a pantograph, the Characters cannot be manipulated, deleted, or added. Attempts to run the check through a printer will result in difficulty or impossibility to exactly line up the pantograph lines 2704.

Figure 27B:
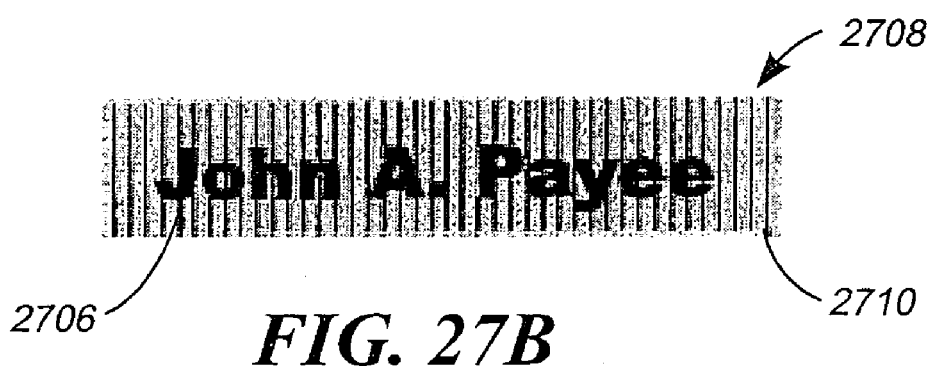
FIG. 27B is a diagram illustrating a pantograph according to one embodiment of the present invention.

FIG. 27b shows a second embodiment of the pantograph 2708, which includes, similar to the embodiment of FIG. 27a, a rectangular shape that covers the characters 2706 forming the payee name. The pantograph 2708 differs from the pantograph 2702 of FIG. 27a, however, in that the lines 2710 are vertical lines are do not alter color as they pass through the characters 2706. Because the vertical lines 2710 do not change color, for ease of readability, it is advantageous to provide a larger space between each line. In other embodiments, the vertical lines reverse color as they pass through the characters 2706. In other embodiments, the lines simple change color as they pass through the characters 2706.

Figure 27C:
FIG. 27C is a diagram illustrating a pantograph according to one embodiment of the present invention.

A third embodiment of the pantograph of the present invention is shown in FIG. 27c. In FIG. 27c, the pantograph 2712 is made of two words, in this example "Positive Pay," instead of a rectangle with lines as in the embodiments shown in FIGS. 27a and 27b.

Figure 27D:
FIG. 27D is a diagram illustrating a pantograph according to one embodiment of the present invention.

FIG. 27d shows one additional embodiment of a pantograph, where the pantograph 2714 is any number of words or characters printed over the payee's name and can be at an angle that intercepts the characters of the payee's name.

In other embodiments, the printer is instructed to increase resolution as it prints the payee name and returns to normal resolution when it prints other text on the check. The printer can also be instructed to print in higher resolution as it prints a MICR line and/or signature on the check.

XV. Positive Pay Via Remote Server

Figure 28:
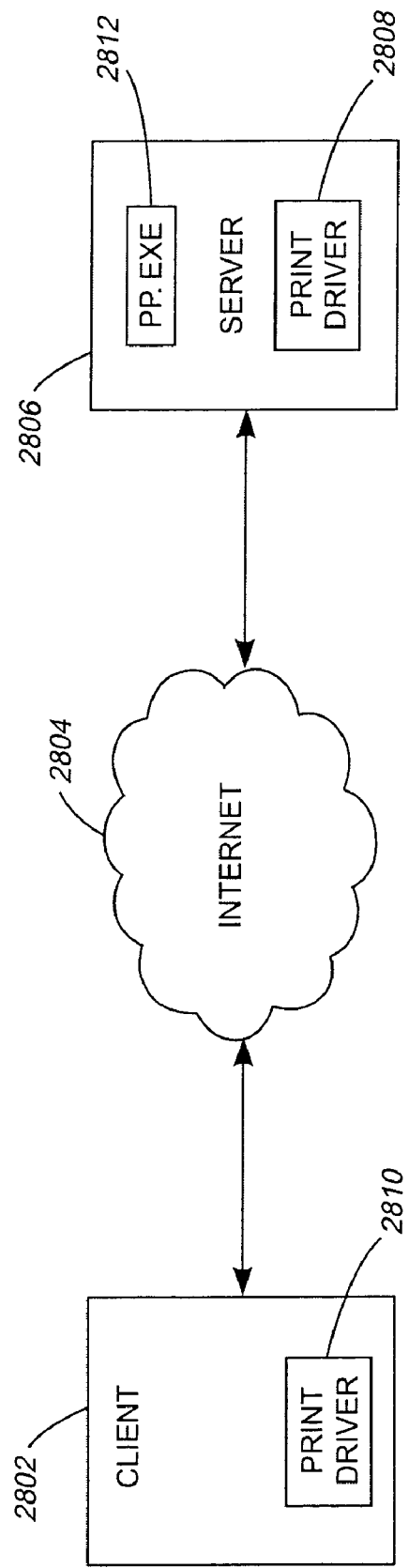
FIG. 28 is a diagram illustrating a web based Positive Pay and printing system architecture according on an embodiment of the present invention.

FIG. 28 illustrates a web-based implementation of the present invention. The embodiment of FIG. 28 includes a client 2802, a communication network 2804, such as the internet, and a server 2806. The client 2802 can connect to the network 2804 via a phone line, dedicated subscriber line, T1 line, or the like. A version of the Positive Pay executable program 2812 resides on the server 2806. Also on the server 2806 is a print driver program that is downloadable to the client device 2802, where it will be installed and reside as print driver 2810. Most Windows clients have built-in support for AES Internet Printing Protocol (IPP) or can download IPP support. When a client has IPP support installed, they can view and connect to printers from within their Web browser. When a printer is created and shared, it becomes available to multiple users through an Internet browser.

The embodiment shown in FIG. 28, which is a web-based printing embodiment of the present invention, obviates the need to perform a full installation of a Positive Pay executable software file(s) on a client computer and thereby reduces the potential for installation problems.

Placing the software 2812 on a remote internet server 2806 requires the user to do no more than load the print driver 2808 on the client device 2802. In one embodiment, this is accomplished by going to a bank website and clicking a single button. The user, with a proper personal identification number (PIN), can then go to a listing of at least one account and select each account that will participate in Positive Pay. Once sent to the internet server 2806, the Positive Pay information is parsed off and sent to the bank's own database. Only a remapped print stream is relayed back to the client device 2802 for local printing.

Web-based printing provides several additional advantages. Through use of the web-based printing, the bank can be notified immediately. This is advantageous to the customer and to the bank. For instance, in the event of a check being issued from an account that currently has insufficient funds, the bank can alert the customer before the check is ever presented for payment. In addition, less information will need to be transmitted. When the printer is accessed, the account number is specified. Therefore, the account number does not need to be sent with each record. Furthermore, there is no need to install a special version of an operating system, since only a printer drive and no secondary software is installed. Additionally, special features may be implemented, such as signaling, through use of a check box or otherwise, to the bank that a signature file should be used to ensure an exact match of the payee's signature appearing on the issued check.

Figure 29:
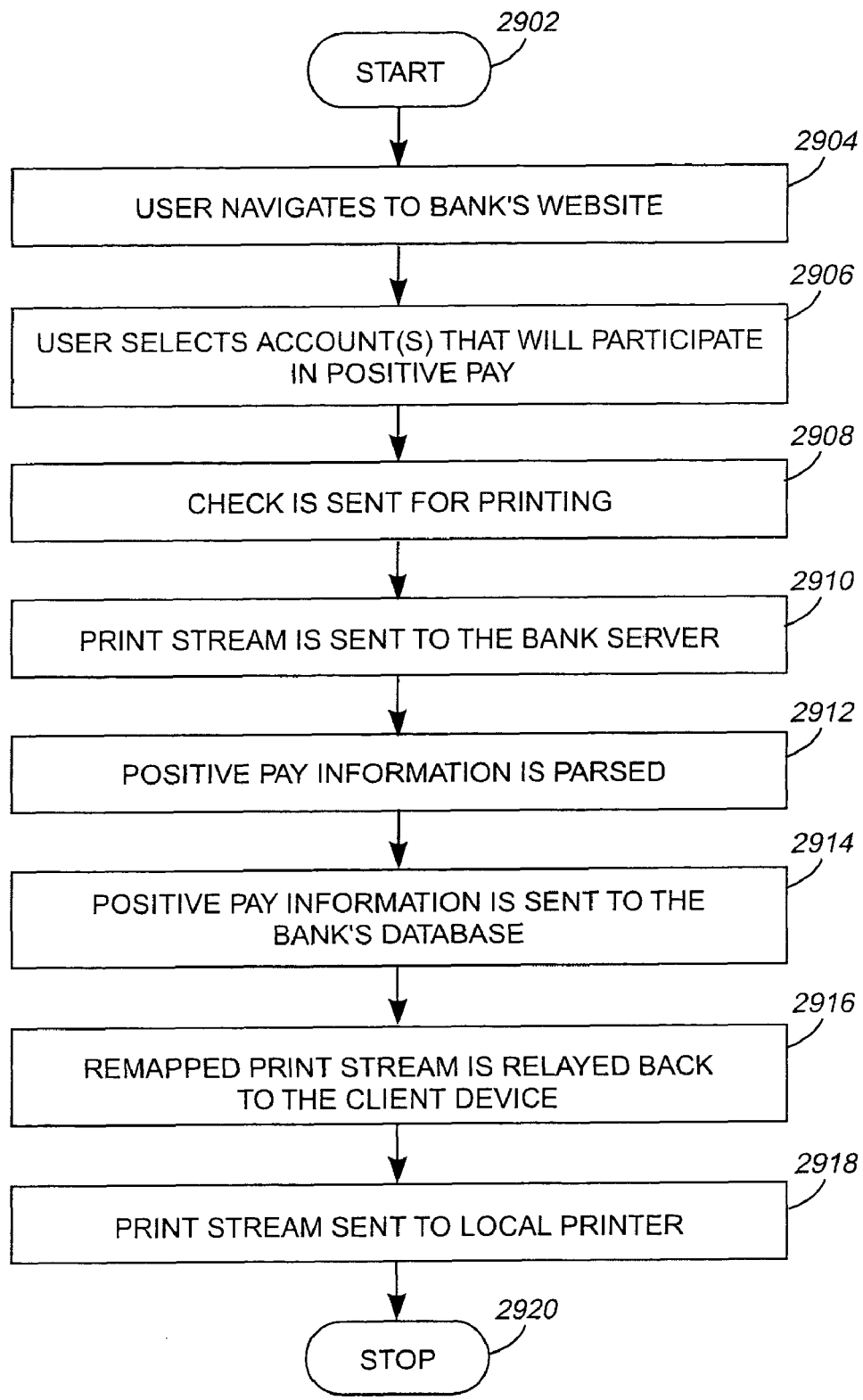
FIG. 29 is a flowchart depicting the operation and control flow of the web-based Positive Pay and printing process of FIG. 28.

FIG. 29 is a flowchart depicting the operation and control flow of the web-based Positive Pay system according to the embodiment of FIG. 28. The control flow of FIG. 29 begins with step 2902 and proceeds directly to step 2904 where a user using a client device navigates a web browser to a bank's website. The user then selects one or more accounts that will participate in Positive Pay in step 2906. In step 2908 check is sent for printing. The print stream, including check information is sent to the bank server 2806 in step 2910. Once sent to the bank server 2806, the Positive Pay information is parsed off in step 2912 and sent to the bank's own database in step 2914. A remapped print stream is then relayed back to the client device 2802 in step 2916. The print stream is sent to a local printer in step 2918 and the flow stops at step 2920.

XVI. Exemplary Implementations

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 30:
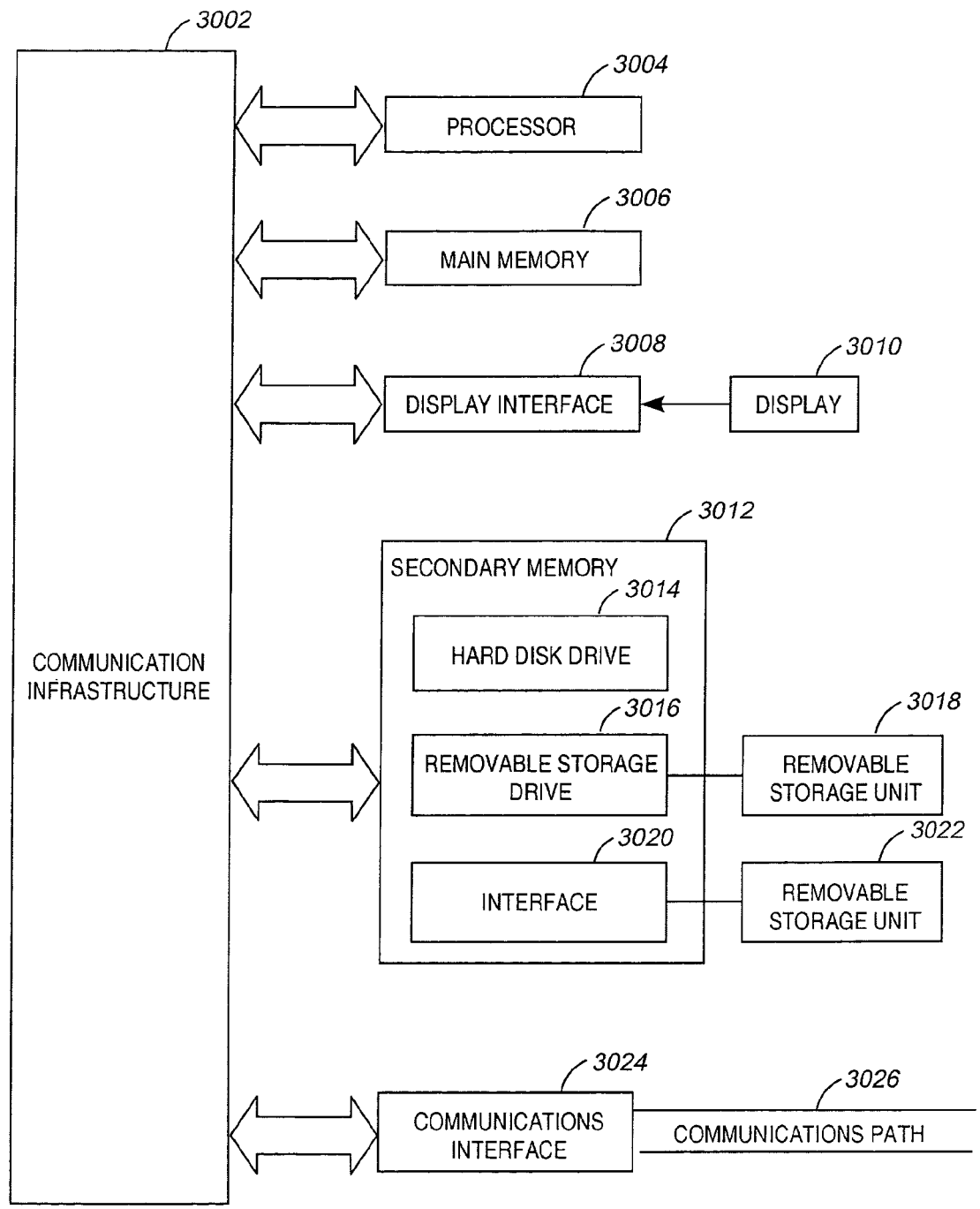
FIG. 30 is a block diagram of a computer system useful for implementing the present invention.

FIG. 30 is a block diagram of a computer system useful for implementing an embodiment of the present invention. The computer system includes one or more processors, such as processor 3004. The processor 3004 is connected to a communication infrastructure 3002 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 3008 that forwards graphics, text, and other data from the communication infrastructure 3002 (or from a frame buffer not shown) for display on the display unit 3010. The computer system also includes a main memory 3006, preferably random access memory (RAM), and may also include a secondary memory 3012. The secondary memory 3012 may include, for example, a hard disk drive 3014 and/or a removable storage drive 3016, representing a floppy disk drive, a magnetic tape drive, an optical disk drive, etc. The removable storage drive 3016 reads from and/or writes to a removable storage unit 3018 in a manner well known to those having ordinary skill in the art. Removable storage unit 3018, represents a floppy disk, magnetic tape, optical disk, etc. which is read by and written to by removable storage drive 3016. As will be appreciated, the removable storage unit 3018 includes a computer usable storage medium having stored therein computer software and/or data.

In alternative embodiments, the secondary memory 3012 may include other similar means for allowing computer programs or other instructions to be loaded into the computer system. Such means may include, for example, a removable storage unit 3022 and an interface 3020. Examples of such may include a program cartridge and cartridge interface (such as that found in video game devices), a removable memory chip (such as an EPROM, or PROM) and associated socket, and other removable storage units 3022 and interfaces 3020 which allow software and data to be transferred from the removable storage unit 3022 to the computer system.

The computer system may also include a communications interface 3024. Communications interface 3024 allows software and data to be transferred between the computer system and external devices. Examples of communications interface 3024 may include a modem, a network interface (such as an Ethernet card), a communications port, a PCMCIA slot and card, etc. Software and data transferred via communications interface 3024 are in the form of signals which may be, for example, electronic, electromagnetic, optical, or other signals capable of being received by communications interface 3024. These signals are provided to communications interface 3024 via a communications path (i.e., channel) 3026. This channel 3026 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 3006 and secondary memory 3012, removable storage drive 3016, a hard disk installed in hard disk drive 3014, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems.

Computer programs (also called computer control logic) are stored in main memory 3006 and/or secondary memory 3012. Computer programs may also be received via communications interface 3024. Such computer programs, when executed, enable the computer system to perform the features of the present invention as discussed herein. In particular, the computer programs, when executed, enable the processor 3004 to perform the features of the computer system. Accordingly, such computer programs represent controllers of the computer system.

XVII. Conclusion

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for capturing draft information during a print process, the method comprising:
    reading a spool file containing draft information in response to a print command being executed by an application;
    extracting at least a portion of the draft information from the spool file; and
    generating an output file containing the at least a portion of the draft information in the spool file;
    wherein the format of the output file is EMF if the spool file contains image information, and wherein the format of the output file is text format if the spool file does not contain image information; and
    wherein the output file includes at least one of an amount of the draft, a draft identifier, a payee identifier, a drawee identifier, and a drawor identifier.

2. The method according to claim 1, further comprising:
    modifying the extracted draft information to conform to a template.

3. The method according to claim 1, further comprising:
    sending the output file to a drawee of the draft.

4. The method of claim 3 wherein the output file is transmitted to the drawee via at least one of:
    a printer;
    a hard disk;
    a floppy disk; and
    a network.

5. The method according to claim 1, wherein the spool file is written to a disk in Extended Metafile Format (EMF).

6. The method according to claim 1, further comprising:
    inserting at least one filler character into a payee identifier area of the template.

7. The method according to claim 1, further comprising:
    inserting a pantograph into a payee identifier area of the template.

8. The method according to claim 7, wherein the pantograph does at least one of:
    goes negative as it intersects characters of a payee's name in the payee identifier area;
    covers at least part of an area around a payee's name in the payee identifier area; and
    increases a distance between lines within the pantograph as the pantograph intersects with characters of a payee's name in the payee identifier area.

9. A system for reporting an issued draft to a drawee, the system comprising:
    a spool file containing draft information and created in response to a print command;
    an output file generated based on at least a portion of the draft information extracted from the spool file and modified to conform to a template; and
    a drawee destination in which to send at least a portion of the draft information in the output file;
    wherein the spool file is written to a disk in Extended Metafile Format (EMF); and
    wherein the format of the output file is EMF if the spool file contains image information, and wherein the format of the output file is text format if the spool file does not contain image information.

10. The system according to claim 9, further comprising:
    at least one filler character inserted to a payee identifier area of the template to at least partially fill the payee identifier area of the template.

11. A computer program product for capturing draft information during a print process, the computer program product comprising:
    a storage medium readable by a processing circuit and storing instructions for execution by the processing circuit for performing a method comprising:
        reading a spool file containing draft information in response to a print command being executed by an application;
        extracting at least a portion of the draft information from the spool file; and
        generating an output file containing the at least a portion of the draft information in the spool file;
        wherein the output file includes at least one of an amount of the draft, a draft identifier, a payee identifier, a drawee identifier, and a drawor identifier; and
        wherein the format of the output file is EMF if the spool file contains image information, and wherein the format of the output file is text format if the spool file does not contain image information.

12. The computer program product according to claim 11, further comprising:
    modifying the extracted draft information to conform to a template.

13. The computer program product according to claim 11, further comprising:
    sending the output file to a drawee of the draft.

14. The computer program product of claim 13 wherein the output file is transmitted to the drawee via at least one of:
    a printer;
    a hard disk;
    a floppy disk; and
    a network.

15. The computer program product according to claim 11, wherein the spool file is written to a disk in Extended Metafile Format (EMF).

16. The computer program product according to claim 11, further comprising:
    inserting at least one filler character into a payee identifier area of the template.

17. The computer program product according to claim 11, further comprising:
    inserting a pantograph into a payee identifier area of the template.

18. The computer program product according to claim 17, wherein the pantograph does at least one of:
    goes negative as it intersects characters of a payee's name in the payee identifier area;
    covers at least part of an area around a payee's name in the payee identifier area; and
    increases a distance between lines within the pantograph as the pantograph intersects with characters of a payee's name in the payee identifier area.

* * * * *